(12) United States Patent
Scott et al.

(10) Patent No.: US 11,707,786 B2
(45) Date of Patent: Jul. 25, 2023

(54) APPARATUS AND METHOD FOR INTERNAL SURFACE DENSIFICATION OF POWDER METAL ARTICLES

(71) Applicant: PMG Indiana LLC, Columbus, IN (US)

(72) Inventors: Michael T Scott, Nashville, IN (US); Rajesh Parameswaran, Xenia, OH (US); Ricardo Lodeiro Guerra, Fussen (DE); Christian Dennert, Pinswang (AT)

(73) Assignee: PMG Indiana LLC, Columbus, IN (US)

( * ) Notice: Subject to any disclaimer, the term of this patent is extended or adjusted under 35 U.S.C. 154(b) by 61 days.

(21) Appl. No.: 16/851,828

(22) Filed: Apr. 17, 2020

(65) Prior Publication Data
US 2021/0323062 A1 Oct. 21, 2021

(51) Int. Cl.
*B22F 5/08* (2006.01)
(52) U.S. Cl.
CPC .......... *B22F 5/085* (2013.01); *B22F 2998/10* (2013.01); *B22F 2999/00* (2013.01)
(58) Field of Classification Search
CPC ....... B22F 5/085; B22F 3/16; Y10T 29/49474
See application file for complete search history.

(56) References Cited

U.S. PATENT DOCUMENTS

| 3,828,628 | A | * | 8/1974 | Roger | ............... | B21K 5/20 |
| | | | | | | 76/107.1 |
| 3,842,646 | A | | 10/1974 | Kuhn | | |

(Continued)

FOREIGN PATENT DOCUMENTS

| AT | 514778 B1 | 2/2016 |
| AT | 515352 B1 | 9/2017 |

(Continued)

OTHER PUBLICATIONS

JPH0685971B2 Machine Translation From Google Patents (Year: 1990).*

(Continued)

*Primary Examiner* — Michael W Hotchkiss
(74) *Attorney, Agent, or Firm* — Metz Lewis Brodman Must O'Keefe LLC

(57) ABSTRACT

A method and apparatus for surface densification of powder metal annular preforms is described. A forming tool has external helical teeth corresponding to internal helical teeth of the preform. A die correspondingly configured to the external splines of the preform circumferentially surrounds the forming tool. The forming tool, die and lower punch(es) collectively define an aperture dimensioned to receive the preform. Upper punch(es) encase the preform in the aperture. Surface densification of the internal surface of the preform is achieved by movement of the preform axially over the forming tool. External splines of the preform and corresponding die splines direct the preform axially while internal helical teeth and corresponding forming teeth direct the forming tool to rotate as the preform moves. The forming teeth have varying dimensions in the circumferential and radial directions to apply compression and relaxation to densify the surface of the preform helical teeth.

19 Claims, 15 Drawing Sheets

(56) References Cited

U.S. PATENT DOCUMENTS

| | | | | |
|---|---|---|---|---|
| 4,111,031 | A * | 9/1978 | Vennemeyer | B21K 1/30 29/893.3 |
| 4,485,657 | A | 12/1984 | Ridley et al. | |
| 4,924,690 | A * | 5/1990 | Kanamaru | B21K 1/30 72/343 |
| 5,009,842 | A | 4/1991 | Hendrickson et al. | |
| 5,325,698 | A | 7/1994 | Nagpal et al. | |
| 5,366,363 | A * | 11/1994 | Good | B22F 5/08 425/352 |
| 5,390,414 | A * | 2/1995 | Lisowsky | B22F 5/08 29/893.34 |
| 5,540,883 | A | 7/1996 | Jones et al. | |
| 5,659,955 | A | 8/1997 | Plamper et al. | |
| 5,711,187 | A * | 1/1998 | Cole | C21D 9/32 74/460 |
| 5,729,822 | A | 3/1998 | Shivanath | |
| 5,996,229 | A * | 12/1999 | Yang | B22F 5/08 72/355.6 |
| 6,013,225 | A * | 1/2000 | Cadle | B22F 3/16 419/29 |
| 6,017,489 | A | 1/2000 | Woolf | |
| 6,044,555 | A * | 4/2000 | Jacob | B22F 3/16 29/893.34 |
| 6,113,848 | A * | 9/2000 | Sugimoto | B21K 1/30 419/68 |
| 6,134,786 | A | 10/2000 | Graupner et al. | |
| 6,165,400 | A * | 12/2000 | Hinzmann | B21K 1/30 264/120 |
| 6,168,754 | B1 * | 1/2001 | Woolf | B22F 3/03 29/893.34 |
| 6,592,809 | B1 * | 7/2003 | Anderson | B22F 3/16 419/28 |
| 6,630,101 | B2 | 10/2003 | Anderson et al. | |
| 6,899,846 | B2 | 5/2005 | Woolf | |
| 6,974,012 | B2 * | 12/2005 | Rau | B22F 5/08 192/108 |
| 7,025,929 | B2 * | 4/2006 | Trasorras | B22F 5/08 419/28 |
| 7,111,395 | B2 * | 9/2006 | Sandner | B21H 5/022 29/893.3 |
| 7,160,351 | B2 | 1/2007 | Trasorras et al. | |
| 7,364,803 | B1 * | 4/2008 | Anderson | B21K 1/30 419/48 |
| 7,534,391 | B2 | 5/2009 | Trasorras et al. | |
| 7,578,963 | B2 | 8/2009 | Trasorras et al. | |
| 7,854,995 | B1 * | 12/2010 | Anderson | B21K 1/305 428/546 |
| 8,196,488 | B2 * | 6/2012 | O-Oka | B21K 1/305 74/458 |
| 8,309,019 | B2 * | 11/2012 | Chiesa | B21J 5/12 419/28 |
| 8,415,268 | B2 * | 4/2013 | Eger | C07C 17/02 502/300 |
| 8,517,884 | B2 | 8/2013 | Geiman et al. | |
| 9,248,503 | B2 * | 2/2016 | Chiesa | B22F 3/17 |
| 10,618,099 | B2 * | 4/2020 | Nakai | B22F 3/24 |
| 11,000,898 | B2 * | 5/2021 | Roessler | B22F 3/164 |
| 11,305,334 | B2 * | 4/2022 | Suzuki | B21J 9/02 |
| 2004/0062673 | A1 * | 4/2004 | Trasorras | B22F 5/08 419/28 |
| 2004/0136858 | A1 | 7/2004 | Woolf | |
| 2004/0219051 | A1 * | 11/2004 | Sonti | C21D 1/20 419/31 |
| 2005/0226759 | A1 * | 10/2005 | Trasorras | B22F 5/085 419/28 |
| 2006/0024189 | A1 | 2/2006 | Trasorras et al. | |
| 2007/0028446 | A1 * | 2/2007 | Arit | B22F 5/085 29/893.34 |
| 2008/0138562 | A1 * | 6/2008 | Kotthoff | B21H 5/022 428/66.1 |
| 2008/0152940 | A1 * | 6/2008 | Kotthoff | B21H 5/022 428/610 |
| 2008/0166579 | A1 * | 7/2008 | Kotthoff | B21H 5/022 703/7 |
| 2008/0282544 | A1 * | 11/2008 | Lawcock | B22F 5/08 29/893.32 |
| 2009/0257905 | A1 * | 10/2009 | Hartner | B30B 15/026 419/66 |
| 2009/0317582 | A1 * | 12/2009 | Schmid | C22C 33/0257 428/66.1 |
| 2010/0083782 | A1 * | 4/2010 | Cheisa | B22F 5/085 74/458 |
| 2010/0178190 | A1 * | 7/2010 | Colombo | F16H 55/06 418/161 |
| 2011/0126654 | A1 * | 6/2011 | Lev | B22F 5/08 74/459.5 |
| 2011/0132057 | A1 * | 6/2011 | Schmid | B22F 3/03 72/352 |
| 2013/0068582 | A1 | 3/2013 | Kim et al. | |
| 2018/0036791 | A1 | 2/2018 | Simon | |
| 2019/0224752 | A1 * | 7/2019 | Sonoda | B22F 3/162 |
| 2020/0393031 | A1 * | 12/2020 | Li | B29D 15/00 |

FOREIGN PATENT DOCUMENTS

| | | | |
|---|---|---|---|
| AT | 520315 | B1 | 3/2019 |
| CN | 102705477 | A | 3/2012 |
| DE | 102005027054 | A1 | 12/2006 |
| DE | 10247330 | B4 | 2/2013 |
| DE | 102016200341 | A1 | 7/2016 |
| DE | 102016112807 | A1 | 1/2017 |
| DE | 102018003433 | A1 | 11/2018 |
| EP | 1042091 | B1 | 2/2003 |
| EP | 2060346 | A2 | 3/2008 |
| EP | 3040142 | A1 | 7/2016 |
| EP | 3293414 | A1 | 3/2018 |
| JP | H0685971 | B2 * | 11/1990 ............ B21K 1/305 |
| WO | 9745219 | A1 | 4/1997 |
| WO | 2007128013 | A1 | 11/2007 |
| WO | 2008073952 | A2 | 6/2008 |
| WO | 2008139323 | A2 | 11/2008 |
| WO | 2011153574 | A1 | 12/2011 |
| WO | 2012027761 | A1 | 3/2012 |
| WO | 102016123407 | A1 | 6/2017 |

OTHER PUBLICATIONS

"ANSI/AGMA 2015-1-A01: Accuracy Classification System-Tangential Measurements for Cylindrical Gears," American National Standard, American Gear Manufacturers Association (2002), pp. 1-37, Alexandria, Virginia.

International Searching Authority; International Search Report and Written Opinion of the International Searching Authority; International Application No. PCT/US2021/027628; Patent Cooperation Treaty; pp. 1-7; publisher United States International Searching Authority; Published Alexandria, Virginia, US; dated Jul. 16, 2021; copy enclosed (7 pages).

* cited by examiner

APPARATUS AND METHOD FOR INTERNAL SURFACE DENSIFICATION OF POWDER METAL ARTICLES

FIELD OF THE INVENTION

This invention relates to apparatus and methods of densification of preforms, and more particularly, to apparatus and methods of densifying internal annular articles with spur or helical forms.

BACKGROUND

Annular articles such as ring gears are used in many applications. For instance, automatic transmissions today use several epicyclic or planetary gear sets arranged in stages in order to achieve a multiplicity of gear ratios. Typical epicyclic gear trains consist of a sun gear, one or more planetary pinions or gears mounted on a movable carrier and revolving around the sun gear, and a single annulus or ring gear surrounding the remaining gears and engaging the planetary pinion(s). Annulus or ring gears are a key element of such planetary gear sets and comprise of several internal teeth with a helical form or teeth that interdigitate with corresponding teeth of the planetary pinions, and also possessing a straight external spline for seating in a drum in the transmission. Ring gears are also used in automotive transfer cases, differentials and reduction transmissions for electric motors. Further, planetary gears are also employed in industrial applications, such as pumps.

All these applications are characterized by demanding durability and noise, vibration and harshness (NVH) requirements suitable for use in vehicles, with annular or ring gears operating at high speeds and torque. These requirements in turn, translate to high numbers for gear quality and material strength in contact and bending fatigue. Traditionally, wrought or forged steel has been the material of choice for such ring gears, with a complicated production process involving separate broaching of internal and external forms on a gear blank followed by several machining steps and heat treatment. Frequently, additional operations such as gear rolling or burnishing may be required in order to achieve the required gear quality. For example, manufacturing external gears for transmission applications with forged steel requires a generative approach to cutting the tooth form and creating an undercut in the form that is subsequently removed with a process such as grinding or honing following the heat treatment of the gears. Such an approach allows for the production of external gears with lower gear quality that can be corrected with the grinding or honing operations that follow. Wrought steel internal gears, on the other hand, are not manufactured with a generative cutting process, and consequently achieve higher gear characteristics in the absence of grinding or honing.

In contrast to wrought steel, gears made with powder metallurgy (PM) can be manufactured at a lower cost with a reduction in the number of process steps, particularly in machining. Conventional PM gears, however, cannot match the demanding strength and quality that is the hallmark of gears meant for the current and future generations of transmission applications. Increasing the density of the gears in targeted areas such as flanks and root is one of the established means of achieving the requisite mechanical strength. Roll forming of sintered powder metal gears is one approach to surface densification. For example, U.S. Pat. No. 5,711,187 outlines one rolling technique for the surface densification of helical and spur external gears using a single or twin die rolling machine, with separate and/or simultaneous root and flank rolling under load. German patent DE 10 2018 003 433 discloses a rolling technique for surface densification of helical teeth of a sintered material preform. However, the rolling technique produces roll-formed gears that are likely to have non-uniform densification. This can be somewhat addressed by reversing the direction of rolling, but it adds cost to the overall forming procedure. Gear rolling of internal splines as a finishing process for wrought steel is an established practice. The same practice, though, if adapted to roll powder metal internal helical gears is likely to be accompanied by issues such as non-uniform surface densification and high roundness, especially with large, thin walled ring gears that are typical of automatic transmissions.

A different approach for powder metal gears is to hot forge them to increase density. A disadvantage of impact forging is that the quality and surface finish of the resulting gear are adversely affected by the process. As outlined in U.S. Pat. No. 5,009,842, sintered powder metal preforms are pre-heated to temperatures approaching 1000° C. in a reducing atmosphere and then forged in closed dies to achieve full density before being ejected from the die. While impact forging may be feasible for spur gears with straight tooth forms, it will be challenging to achieve full density for internal and external gears with helix angles larger than 15°, while maintaining the low numbers for gear characteristics mandated for high quality. U.S. Pat. No. 8,517,884 describes powder forged bevel gears with a high density for differential assemblies; there appear no means to apply the same technique for ring gears.

Another approach for powder metal gears is a process known as surface densification, such as described in U.S. Pat. Nos. 6,168,754; 7,578,963; and 7,160,351. In this method, the area at the surface of the helical teeth are densified by passing the preform through a die. This has been done in surface densifying helical teeth on the external surface of a gear, as in U.S. Pat. No. 7,578,963. In other examples, as in U.S. Pat. No. 6,899,846, surface densification is achieved on the outer surfaces of a preform by forcing a shaped densifying tool axially along the exterior surface of the preform toward a blind end and reversing the motion. However, as with impact forging, there appears no means to apply such surface densification methods to ring gears given their combination of internal teeth and external spline structure.

Therefore, a need still exists for a cost-effective approach to the manufacture of internal helical gears of high quality and fatigue resistance and with surface densification in relevant portions of the gear.

SUMMARY

Annular articles, particularly ring gears such as those used in automatic and electric transmissions are complex, having both internal teeth that are helical and often external splines that are straight or axial. The present invention provides high quality surface densification with complex tooling arrangements that specifically accommodate an annular preform having both internal helical teeth and external splines that are straight or axial and create targeted and specific surface densification at particular locations of the preform despite this complexity. For example, prior known surface densification tooling, such as that disclosed in U.S. Pat. No. 7,578,963, focus only one set of teeth and so does not address the relationship of the densification at one surface to the teeth or features on the opposite side of the preform.

A method and apparatus for densifying powdered sintered annular articles such as gears is disclosed. The present invention provides a cost-effective powder metal-based alternative to ring gears for automatic and electric transmissions that are currently made from wrought or forged steel, without sacrificing the strength, durability and surface finish of wrought or forged steel. A preform for an annular gear is first prepared by compacting and sintering a ferrous-based powder according to powder metallurgical methods to an average part density ranging from 7.0 to 7.4 gm/cm³, including the flanks and root of the helical teeth. The preform is then cold worked in the densification apparatus described herein to achieve near-full density at and beneath the surface of the flanks and root of the helical teeth, providing a high quality net-shape surface finish on the same. Finally, the densified gear is subjected to heat treatment, such as carburization with quenching or nitriding in some form, to reach a hardness at the surface and the core that is application dependent, without affecting the surface finish on the flanks and root of the teeth.

To accomplish this, the invention includes a surface densification apparatus including a forming tool and a die spaced apart from the forming tool and at least partially defining an aperture therebetween. Either the forming tool or die may have forming teeth that are correspondingly configured to the helical teeth of the annular preform, which may be on the inner or outer preform surface. In at least one embodiment, these helical teeth and corresponding forming teeth may be angular, such as having a helix angle up to 25°. The forming teeth are dimensioned to fit within the spaces between helical teeth of the preform, and so will provide the constraints necessary for surface densification. The forming teeth are also dimensioned to allow for recovery from the deformation as the helical teeth progress therethrough. For instance, each forming tooth has a varying thickness in the tangential or circumferential direction, producing hourglass-shaped spaces between adjacent forming teeth and providing compression and relaxation on the gear tooth flanks for surface densification. The forming teeth may also vary in the radial dimension to provide compression and relaxation to the gear tooth roots and tips in a radial direction. The forming tool or die may also include a plurality of forming elements each having first and opposite second surfaces with the forming teeth extending longitudinally between the first and second surfaces. The forming elements are arranged successively in the longitudinal or axial direction and preferably are contiguous with one another. The forming teeth of adjacent forming elements align with one another to form continuous paths for the helical teeth of the preform to pass through for uninterrupted densification.

The die is positioned coaxially around at least a portion of the forming tool and may be movable relative thereto. In certain embodiments in which the forming tool includes the forming teeth, the die may include internal splines configured to correspond to the spaces between external splines on the preform. These splines are preferably axial, such that they are parallel to the longitudinal axis. The apparatus further includes first punch(es) to apply pressure to move the preform axially during the densification process and may further include a second punch(es) on which the preform may rest during the densification process. The forming tool, die, and punches collectively define an aperture which is dimensioned to receive and hold the preform as it moves during the densification process, with minimal or no clearance on the surfaces opposite the ones being densified.

The apparatus may include multiple first and second punches, each having an inner punch and an outer punch coaxially or circumferentially disposed about the inner punch. The innermost first and second punches are correspondingly configured to the forming tool, to permit such punches to move along the forming tool during densification as the preform is moved. Similarly, the outermost first and second punches are correspondingly configured to the die to permit the outer punches to move with the preform as it is moved during densification. In at least one embodiment, the forming tool includes the forming teeth and the first and second inner punches have corresponding helical punch teeth, such that the first and second inner punches rotate about the longitudinal axis and the first and second outer punches move axially as the preform moves axially through the forming teeth.

The method of the present invention may include first compacting and sintering a gear preform to an average part density ranging from 7.0 to 7.4 gm/cm³. Once formed, the preform is inserted into the aperture of the surface densification apparatus, guided over an entry portion of the forming tool and seated on the die shelf and/or second punch(es). The preform is then encased in the apparatus by moving the die upward until the first punch(es) are engaged. When so encased, the preform is bounded on all sides by a component of the apparatus.

The method continues with densifying the surfaces of the preform, such as the tooth flanks, roots and tips. Surface densification occurs by the first punch(es) pressing down on the preform and moving it axially downward over the forming teeth. As the preform moves, the helical teeth of the preform move past and engage the forming teeth. The varying forming tooth thicknesses in the tangential or circumferential direction provides compression and relaxation to the preform tooth flanks as the preform moves. Similarly, the changing radial diameter of the forming elements, and thus the forming tooth tips and roots, provide compression and relaxation to the preform tooth roots and tips, respectively, in the radial direction as the preform moves. Notably, the preform moves axially, such as according to external splines in at least one embodiment, but the component carrying the forming teeth rotates as a result of the preform's axial movement. The first punch(es) continue to push the preform over the forming teeth in the densification portion and into the exit portion. Once densification is complete, the method further includes raising the first punch(es) to reveal the densified article in the aperture and removing the densified article from the apparatus. This densified article has certain surface finish characteristics on the gear profile and does not need further processing, such as but not limited to burr removal, that other metallurgic gear production methods require. The densified article may then be heat treated.

The resulting gear has a variable density with a core of medium to high density (about 7.0-7.6 gm/cm³), a layer of near-full density (at least 99% theoretical density) in the layer 0.1-1.0 mm from the surface (preferably 0.5-0.7 mm deep); a DIN 3962 (or AGMA 2015 or ISO 1328 equivalent) quality of 10 or better, preferably in the range of 7 to 10; and profile surface roughness values Ra and Rz superior to those of similar forming techniques such as broaching. The variable density has the advantage of lowering the weight of the annular gear, such as by about 5%-6%, in comparison with one fabricated with wrought or forged steel, while still achieving the required strength and fatigue resistance. Such weight savings are key contributors to improvements in fuel economy. By using powder metallurgy to manufacture the annular or ring gears, the high cost of fabrication associated with separately broaching internal and external forms can be avoided. The high cost of replacing broaching tools as they wear out is also eliminated with the use of the present method and apparatus.

Yet another advantage for the proposed invention is that the surface densification tooling of the present invention may be used in conjunction with other standard equipment for powder metallurgy, such as presses and adaptors, and therefore does not require additional investment for implementation as is the case for other approaches like gear rolling. Surface densification in the manner described here also allows for a superior surface finish of the teeth of the ring gear when compared with that achieved for broached wrought steel ring gears.

Mechanical strength and fatigue resistance for powder metallurgical components are a function of density. The present method and apparatus allow particular areas to be targeted for surface densification, allowing for a tailored densification of the ring gear. For instance, it is possible to have engagement on one flank of the ring gear, such as the drive-side. In such circumstance, the current method permits surface densification on that flank alone. Additionally, flank and root densification can be addressed in conjunction with each other or independently. Other approaches, such as powder forging, are agnostic in their targeting of specific areas of the component being subjected to surface densification and must resort to overall densification to achieve the goals of increased strength and fatigue resistance in particular areas of the part.

Another advantage of the present surface densification method and apparatus is the elimination of distortions in geometry typically seen in powder metallurgy based thin walled components at the end of the sintering step. In the case of ring gears for planetary gear sets, for example, tooth thicknesses may be around 2.0-5.0 mm and experience substantial geometric distortions arising from sintering of the compacted parts. Geometric deviations such as these can be substantially corrected in the subsequent step of surface densification, achieving the tighter tolerances that are consistent with high gear quality.

Yet another advantage of the present method and apparatus for surface densification of annular ring gears is the potential for noise deadening and improved NVH performance of the resulting densified gear.

The present method and apparatus, together with their particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION

Figure 1A:
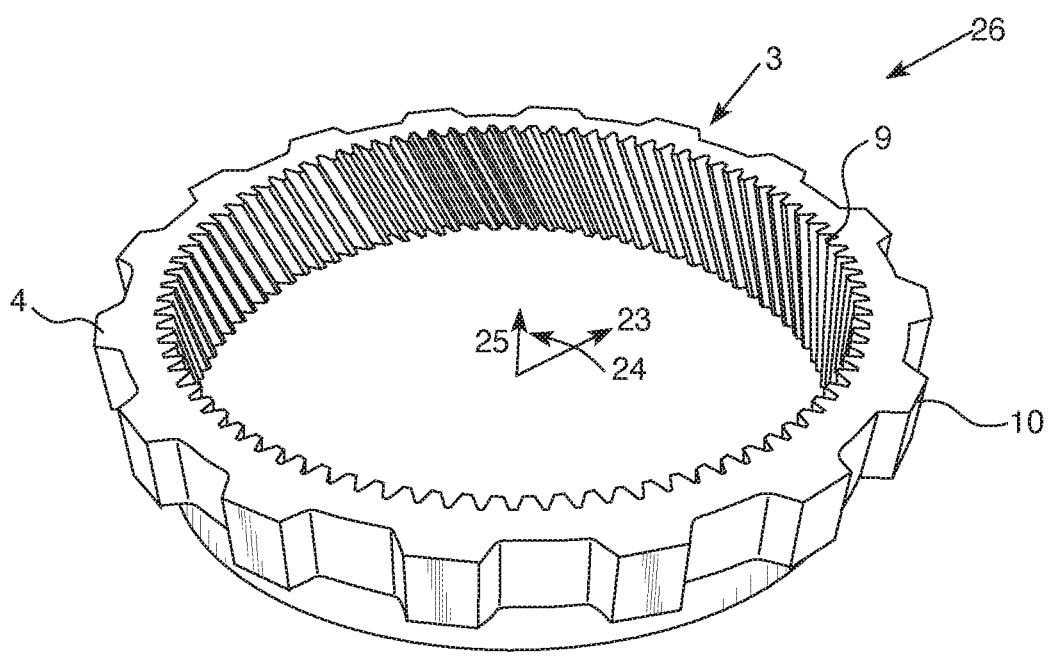
FIG. 1A is a top perspective view of a first exemplary embodiment of preform of an annular gear for densification by the current process.
Figure 1B:
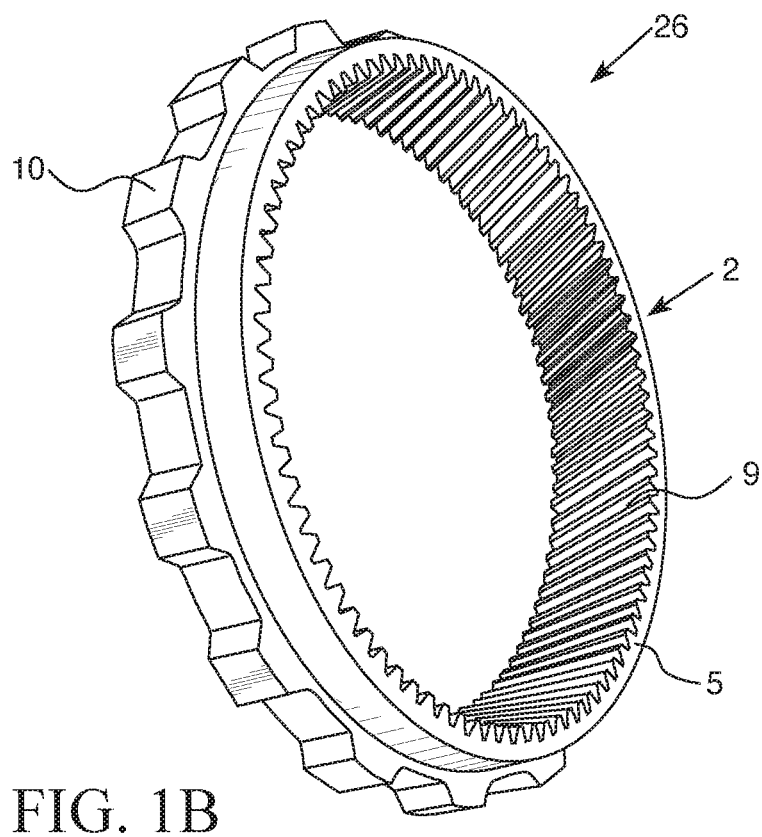
FIG. 1B a side perspective view of the preform of FIG. 1A.
Figure 2:
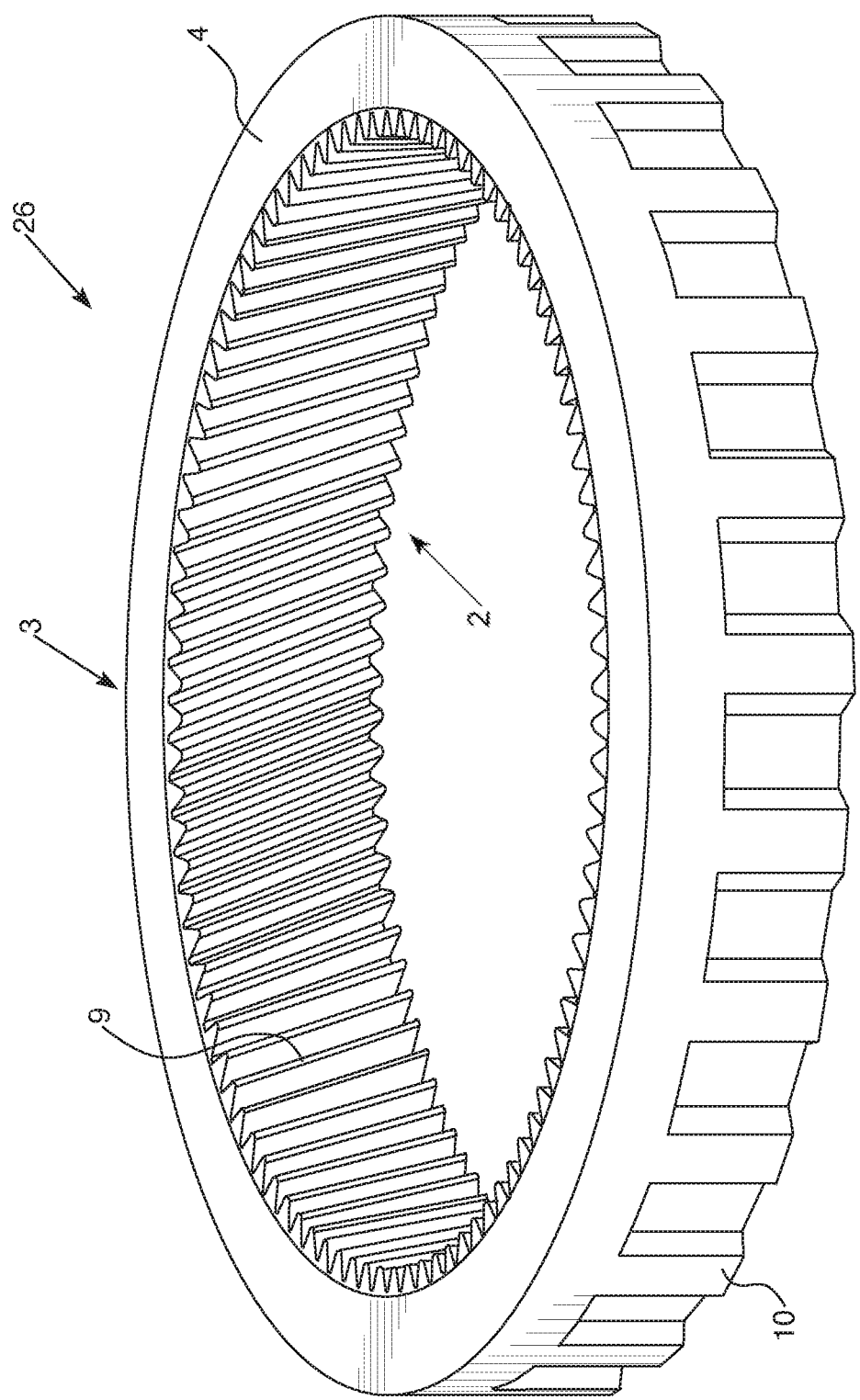
FIG. 2 is a top perspective view of a second exemplary embodiment of preform of an annular gear for densification by the current process.

As shown in the accompanying drawings, the present invention is directed to a method of forming a preform and/or surface densification of powdered sintered annular or ring preforms as well as the apparatus used to perform such method and the resulting annular or ring gear produced by such process. As used herein, the terms "annular" and "ring" may be used interchangeably to refer to a preform having an interior hole. Specifically, the densification method and apparatus of the present invention can be used to surface densify annular or gear rings having teeth or splines on both the internal and external surfaces of the gear and may be used to densify the internal or external teeth, or both simultaneously. At a minimum, the present method and apparatus are used to provide surface densification to the internal teeth of a sintered preform for an annular gear, which may be helical or angled, while retaining the preform in a predetermined aperture with specific tolerances. As used herein, the terms "helical" and "angled" may be used interchangeably to mean at any oblique angle relative to the longitudinal axis. The resulting annular gear has near-full density at the surface of the internal teeth, having high quality, fatigue strength and wear resistance typical of forging but through cold-working of the preform. Although described as densifying annular gears, the present method and apparatus may be used to densify any annular shaped preform.

The present apparatus 100 and method can be used on any preform 26 for an annular or ring shape, such as but not limited to a gear such as may be used in a planetary gear set. The preform 26 may be compacted and sintered from a metal powder blend, preferably using an iron-based powder, which in some embodiments may be a pre-alloyed steel powder, an admixed powder blend of elemental iron powder and one or more of powder metal alloy additions such as molybdenum, chromium or nickel, or combinations thereof. The blend for the compact may also have graphite in addition to lubricants and waxes commonly used. Other powder compositions, blends and elements may be used depending on the particular requirements of the application for the desired resulting gear. In some embodiments, the preform 26 may also be impregnated with inorganic materials such as silica to further improve the quality of the resulting gear following heat treatment by reducing distortion and ensuring a layer of uniform hardness.

The preform 26 may be compacted and sintered to near-net shape, which is understood in the metallurgy industry to mean a shape or geometry that is nearly the final form for the resulting desired gear. Specifically, it can mean excess forming stock for areas of the preform 26 that will be subjected to densification in subsequent steps, such as densification of the root 12, tips 13 and flank 11 of the helical teeth 9, and possibly, an undersized dimension for other portions of the geometry, such as the external spline 10, that will receive its final pre-heat treatment dimension in the densification step.

Figure 3A:
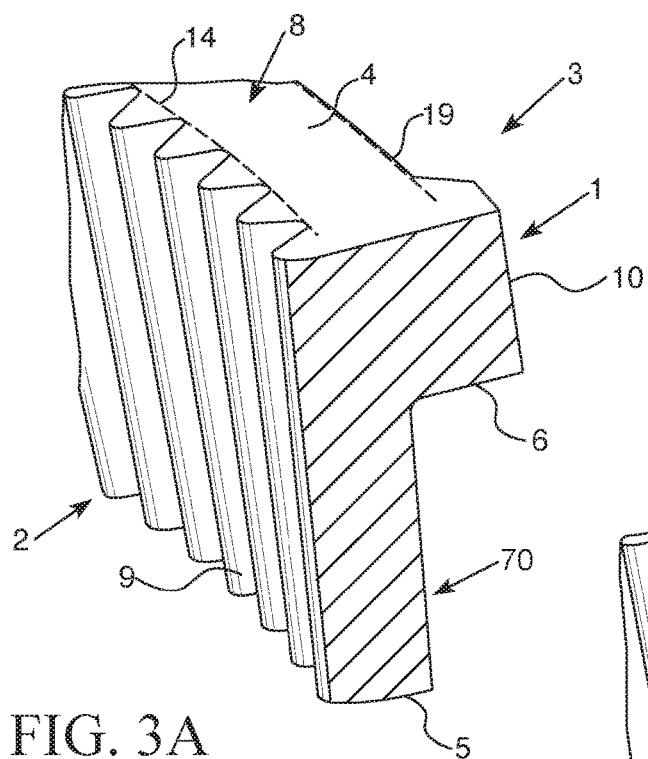
FIG. 3A is partial cutaway view of the preform of FIG. 1A.

The preform 26 may be for any annular article or ring gear as understood in the art, such as but not limited to those used in automotive transmissions. FIGS. 1A-6 show some illustrative examples. For instance, the preform 26 of the annular gear may have a predominantly cylindrical shape having an inner surface 2 defining an inner diameter of the preform 26 and an outer surface 3 defining an outer diameter of the preform 26. The preform 26, and resulting annular article, may have any inner and outer diameter as may be required for the desired application, which may be dictated by the type or size of transmission in which it will be used. The preform 26 may also include a radial wall 8 defined between a major internal diameter 14 and minor external diameter 19 as shown in FIG. 3A. The radial wall 8 may form an inner core of the preform 26 and may have any thickness suitable for the desired resulting annular article, such as but not limited to 2.5-4.5 mm. The preform 26 may also include a first side 4 and an opposite second side 5, each spanning between the inner and outer surfaces 2, 3, as shown in FIG. 3A. In at least one embodiment, the first side 4 forms a top of the preform 26 in an axial direction, and the second side 5 forms a bottom of the preform 26. The distance between the first and second sides 4, 5 of the preform 26 is the height thereof.

Figure 3B:
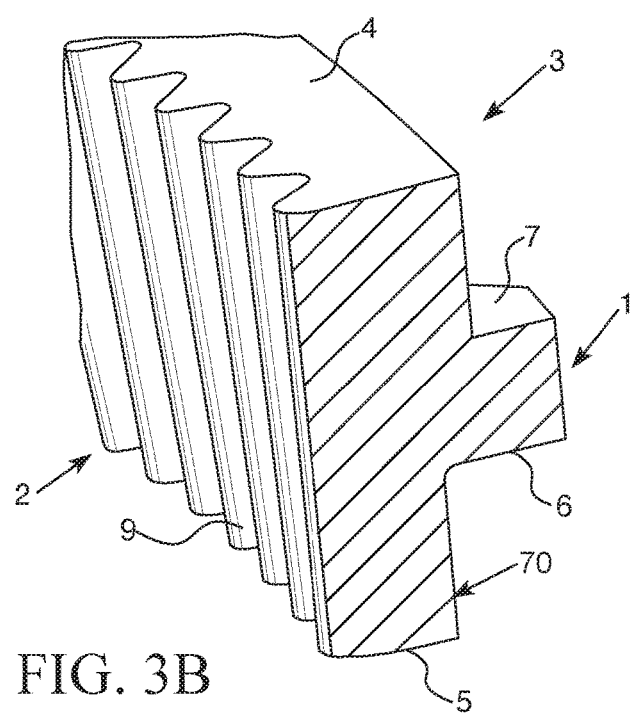
FIG. 3B is a partial cutaway view of another embodiment of the preform.
Figure 4:
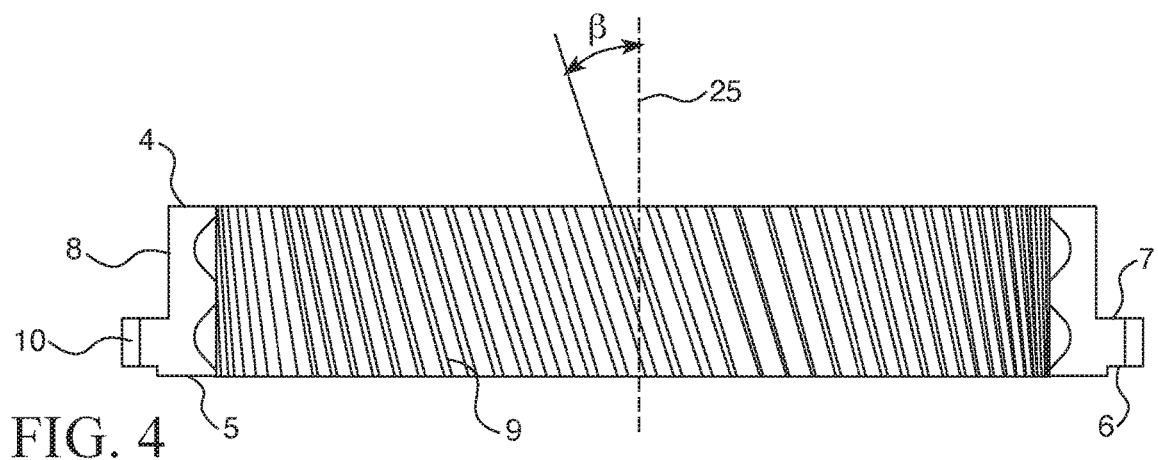
FIG. 4 is a cross-sectional view of a third exemplary embodiment of a preform for densification by the current process.

The preform 26 may include a flange 1 and a hub 70, such as shown in FIGS. 3A and 3B. The hub 70 is the vertical portion of the preform 26 and the flange 1 is the portion that extends radially from the hub 70. In at least one embodiment, such as shown in FIG. 3A, the flange 1 may extend from a terminal end of the hub 70, such as at the first side 4 as shown. Here, the first side 4 of the preform 26 forms one surface of the flange 1. In other embodiments, as shown in FIGS. 3B and 4, the flange 1 may extend from the hub 70 at a location along the length of the hub 70. In these instances, the flange 1 may include a first flange surface 7 near the corresponding side 4. This first flange surface 7 may be at an angle relative to the hub 70, such as about 90° though it may be in the range of 50°-150° relative to the hub 70. A second flange surface 6 makes up the opposite side of the flange 1. The flange 1 may extend from a central portion of the hub 70 substantially equidistant from the first and second sides 4, 5 of the preform, or it may be positioned closer to one side or the other, such as the first side 4 as in FIG. 3B. The flange 1 may extend from any position along the hub 70. When positioned at an intermediary location along the hub 70, the flange 1 produces a first flange surface 7 and second flange surface 6 on opposite sides of the flange 1, as depicted in FIG. 3B, which may be parallel or substantially parallel to the first or second surfaces 4, 5 of the preform. The first and second flange surfaces 7, 6 are spaced apart from the nearest first and second sides 4, 5 of the preform 26 as shown in FIG. 3B. The first and second flange surfaces 7, 6, as well as the first and second sides 4, 5 of the preform 26, may be used in seating and encasing the preform 26 in the apparatus 100, as described hereinafter.

Figure 5:
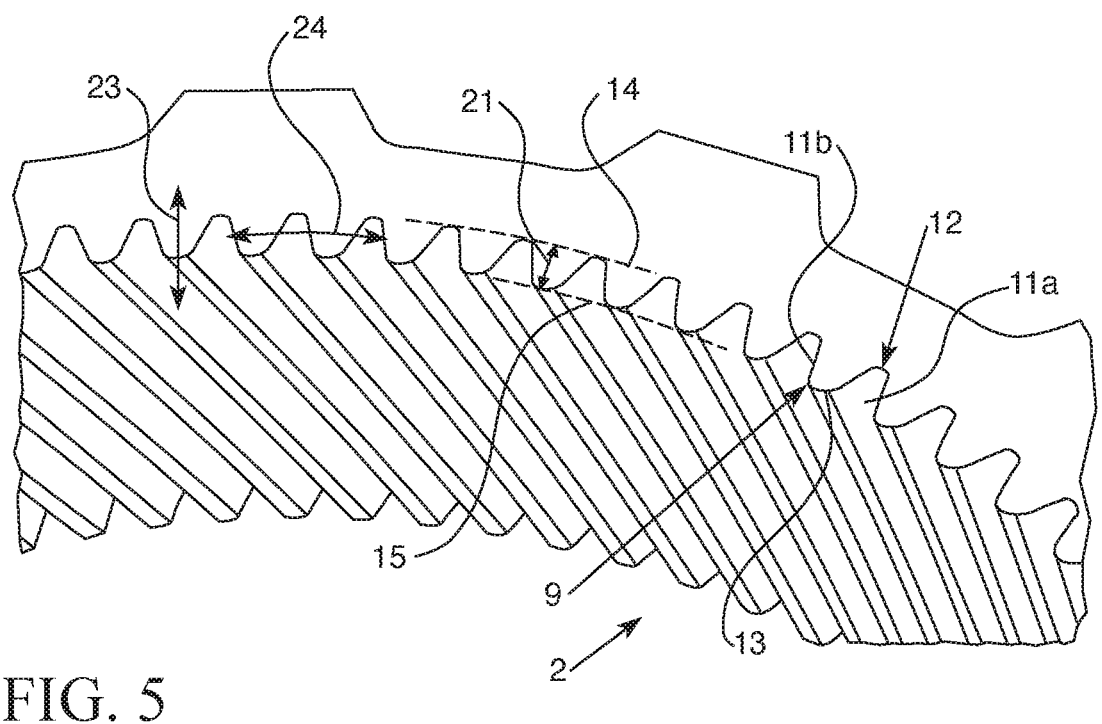
FIG. 5 is a partial perspective view of an exemplary preform showing the internal surface thereof.

One of the inner and outer surfaces 2, 3 of the preform 26 includes a plurality of helical teeth 9. For instance, in at least one embodiment, the helical teeth 9 may project radially inwardly from the body 8 at the inner surface 2, as shown in FIGS. 1A-6. These helical teeth 9 may be dimensioned to engage or otherwise interact with planetary pinions or gears in an epicyclic or planetary gear set such as may be used in automatic transmissions to achieve multiple gear ratios. Preferably, the helical teeth 9 may extend a first height of the preform 26 which may be defined as the entire height of the preform 26, as shown in FIGS. 3A-4. In some embodiments, the helical teeth 9 may only extend second height of the preform 26 which may correspond to the height of the hub 70, which may be less than the full height of the preform 26. In still other embodiments, the helical teeth 9 may extend along a third height of the preform 26 defined as the height of the flange 1. With reference to FIG. 5, each helical tooth 9 may be defined between the helical tooth root 12 at its base and the helical tooth tip 13, defining a helical tooth depth 21 therebetween in the radial direction 23. Each helical tooth 9 may also be defined between first and second helical tooth flanks 11a, 11b in the tangential or circumferential direction 24. As used herein, the terms "tangential" and "circumferential" may be used interchangeably to refer to the direction around the perimeter of the annular preform. The spaces between the helical teeth 9 are defined between the facing flanks 11 from adjacent helical teeth 9 and may be of an involute form. When present in the inner surface 2, the helical tooth tips 13 collectively form a minor internal diameter 15 of the preform 26, whereas the helical tooth roots 12 collectively form a major internal diameter 14 of the preform 26. When present in the outer surface 3, the opposite is true. There may be any number of helical teeth 9 in the preform 26 depending on the required characteristics of the desired resulting annular preform. The helical teeth 9 may have any angle β relative to the longitudinal axis 25 of the preform 26. For instance, in some embodiments the angle β of the helical teeth 9 may be up to 25°. In certain embodiments, the angle β of the helical teeth 9 may be in the range of 15°-25°.

Figure 6:
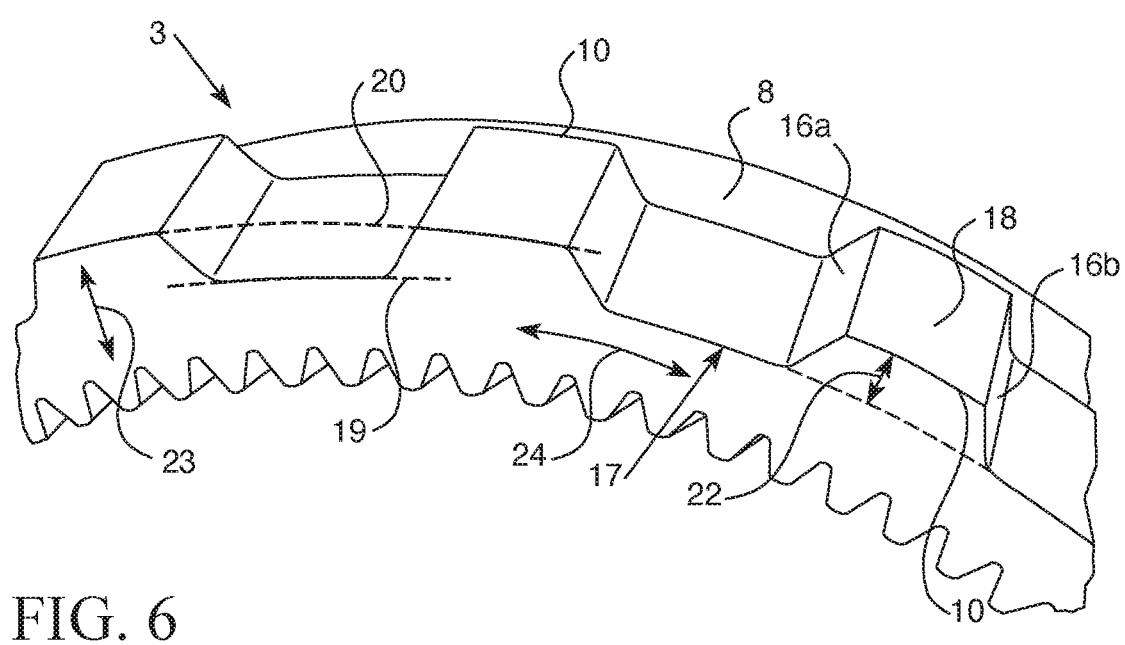
FIG. 6 a partial perspective view of the preform of FIG. 5 showing the external surface thereof.

The preform 26 may also include a plurality of splines 10 projecting radially outwardly from the body 8. The splines 10 may be at the outer surface 3, as shown in FIGS. 1A-6, or at the inner surface 2, and are on the surface opposite from the helical teeth 9. In at least one embodiment, these splines 10 are on the outer surface 3 and are dimensioned to engage or otherwise interact with the drum of an automatic transmissions to seat and align an associated gear set with the remainder of the transmission. The splines 10 may extend along at least a portion of the height of the preform 26. For instance, in at least one embodiment as shown in FIG. 3A, the splines 10 may extend radially outwardly from the outer surface 3 of the preform 26 along only a portion of the height of the preform 26, such as the third height of the preform 26 along the flange 1. These splines 10 may be co-extensive with one end of the preform 26, such as the first side 4 as shown in FIG. 3A or may be spaced apart from the first and second sides 4, 5 of the preform 26, as shown in FIG. 4. In still further embodiments, the splines 10 may be disposed along the preform 26 substantially equidistant from either side 4, 5. As shown in FIG. 6, each spline 10 may be defined between a spline root 17 and spline tip 18 defining a spline depth 22 in the radial direction 23. Each spline 10 may also be defined between first and second spline flanks 16a, 16b in the tangential or circumferential direction 24. The spaces between splines 10 are defined between the facing flanks 16 from adjacent splines 10. When the splines 10 are present in the outer surface 3 of the preform 26, the spline tips 18 collectively form a major external diameter 20 of the preform 26, and the spline roots 17 collectively form a minor external diameter 19 of the preform 26. When the splines 10 are present in the inner surface 2 of the preform 26, the opposite is true.

The splines 10 may have any cross-sectional dimension or shape depending on the required characteristics of the desired resulting annular preform, such as the desired gear and the drum into which it will be inserted. For instance, in some embodiments the splines 10 may have a straight form or cross-sectional shape, such as in FIGS. 1A-6. In other embodiments, the splines 10 may have a curved or curvilinear cross-section or form, or other configuration. Further, in at least one embodiment, the splines 10 extend axially along the body 8 of the preform 26, as shown in FIGS. 1A-6. As used herein, "axially" means in the direction of the longitudinal axis 25 of the preform 26. This axial configuration allows the splines 10 to insert into corresponding grooves in a transmission drum for seating. There may be any number of splines 10 in the preform 26, which may be the same or may be different from the number of internal helical teeth 9. Indeed, the number, spacing and dimensions of splines 10 and helical teeth 9 may be unrelated to one another. Further, in some embodiments the preform 26 may lack any external splines 10, and instead may have a smooth external surface 3 (not shown).

The present invention is directed to an apparatus 100 and method for surface densification of the internal helical teeth 9 of a preform 26 such as described above. The apparatus 100, an illustrative embodiment of which is depicted in exploded view in FIG. 7A and assembled in FIGS. 18-21, is used to cold-work the preform 26 to apply pressure to each of the helical teeth 9 in radial 23 and tangential 24 directions in a plane normal to the longitudinal axis 25 of the preform 26 (shown in FIG. 1A). Specifically, at least the helical tooth flanks 11a, 11b are densified by this apparatus 100 and method. In some embodiments, the helical tooth roots 12 and/or tips 13 may also be densified by being subjected to constraints leading to an increase in the major and minor internal diameters 14, 15 of the preform 26. At the same time, the major and minor external diameters 19, 20 of the preform 26 may be allowed some limited expansion, no expansion, or even some compression, while the spline flanks 16 of the external splines 10 may be subject to slight or modest squeezing in a tangential direction 24. During this process, each of the splines 10 may also be subject to elasto-plastic deformation, leading to densification in appropriate regions of the splines 10.

Figure 7A:
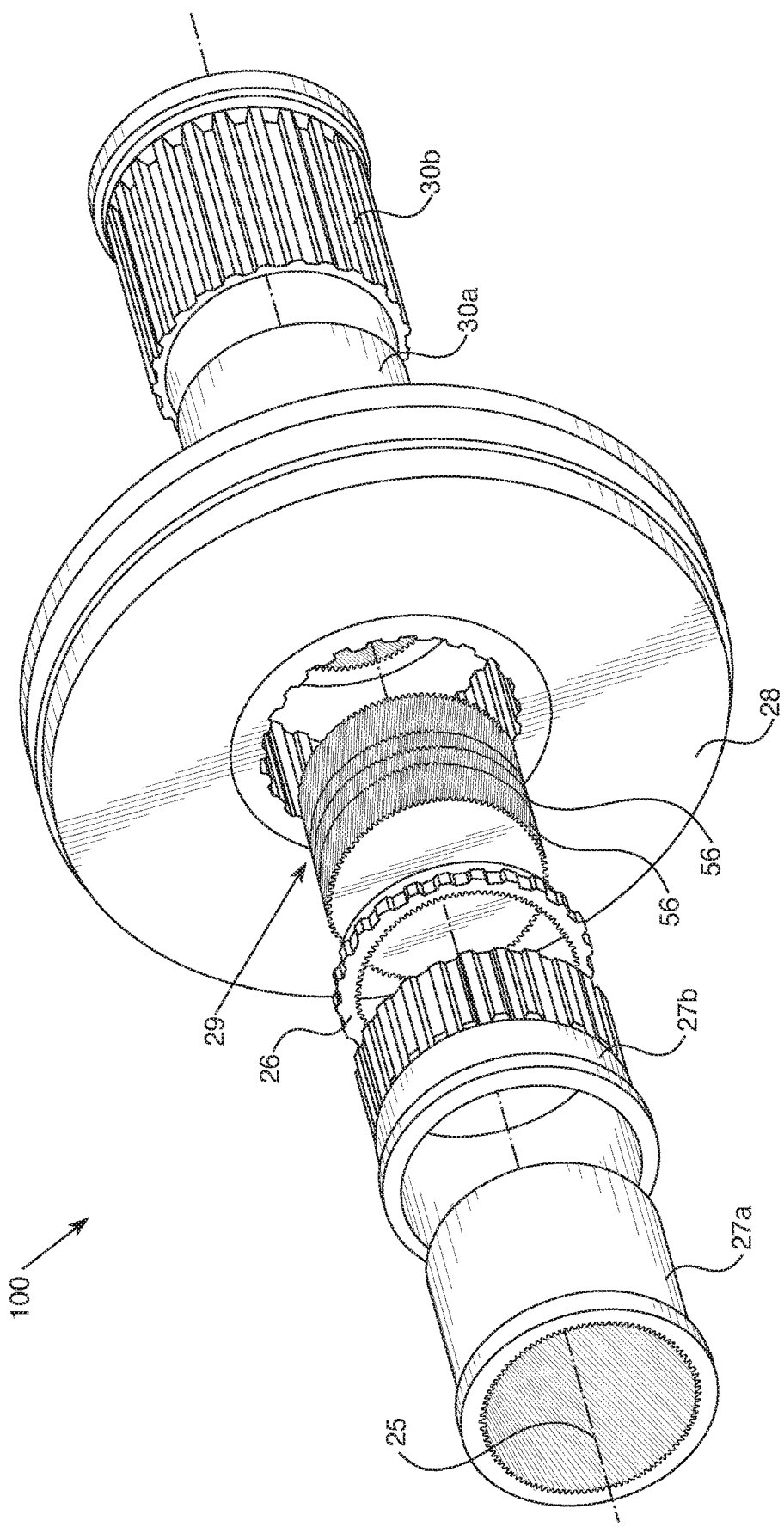
FIG. 7A is an exploded view of one illustrative embodiment of the surface densification apparatus of the present invention where forming teeth are on the outer surface of the forming tool.
Figure 18:
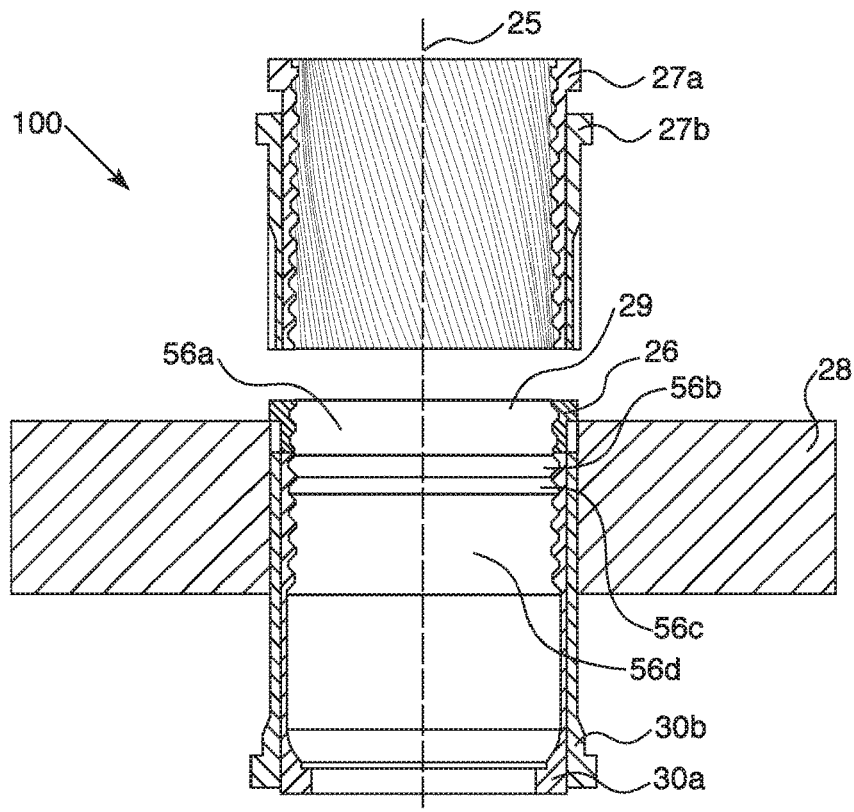
FIG. 18 is a cross-sectional view of one exemplary embodiment of the surface densification apparatus and method, illustrating an alignment step of the method.

As shown in FIGS. 7A-10, the apparatus 100 includes a forming tool 29 and die 28 that collectively at least partially define an aperture 49 therebetween when assembled. The aperture 49 is dimensioned to receive the preform 26 therein for densification, as depicted in FIG. 18. With particular reference to FIGS. 7A and 18, in a typical embodiment of the present invention, the preform 26 is seated in the aperture 49 formed between a die 28 and forming tool 29, and densification occurs by one or more first punches 27a, 27b urging the preform 26 over the forming tool 29 while being supported by one or more second punches 30a, 30b, as explained in greater detail below.

Figure 11:
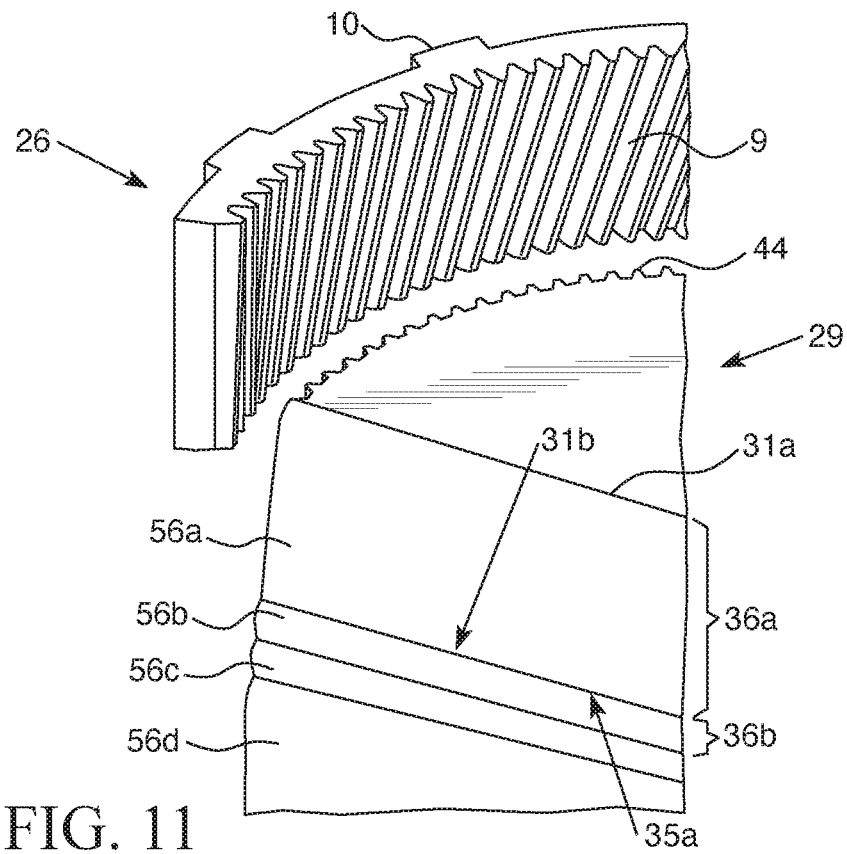
FIG. 11 is a detailed perspective cutaway view of one embodiment of the forming tool and preform.
Figure 15:
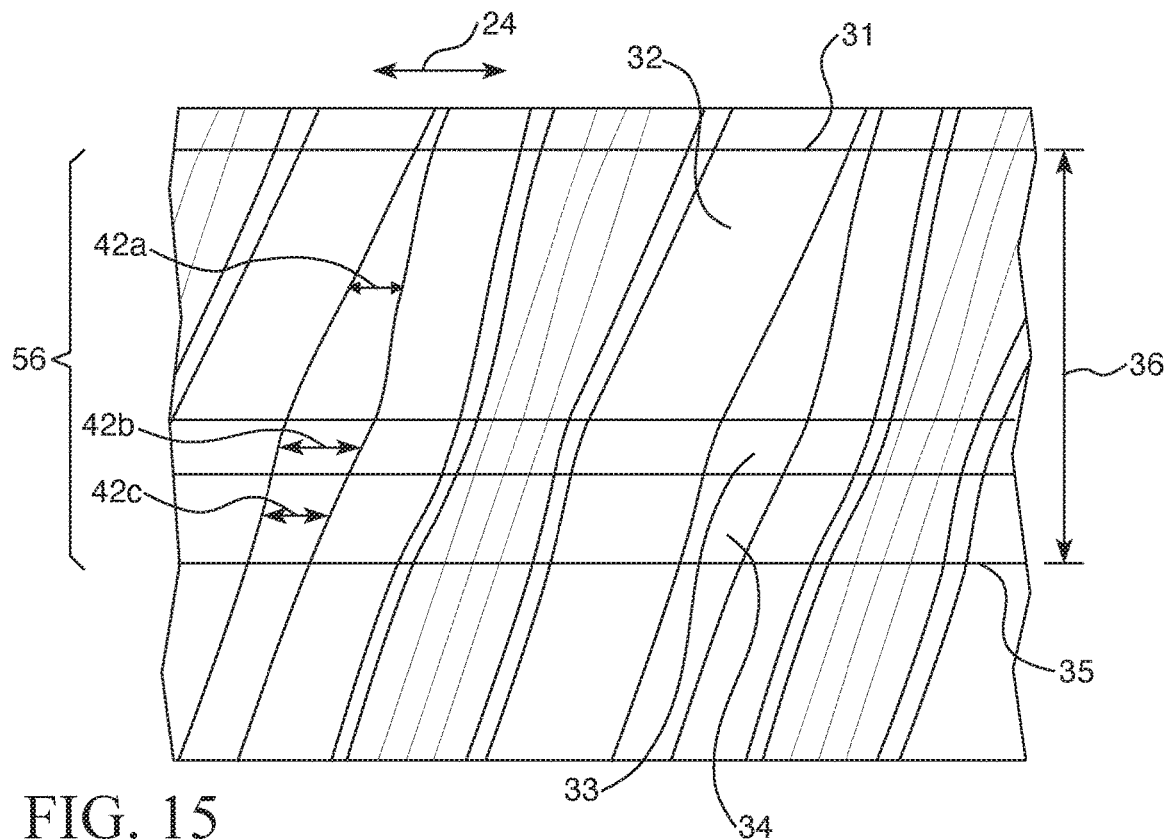
FIG. 15 is an elevational diagram of the forming element.

The forming tool 29 may be fabricated of any material suitable for use in forming applications, such as but not limited to tool steel. As best shown in FIGS. 7A and 11, the forming tool 29 includes a plurality of forming teeth 44 extending radially outwardly from an external surface thereof. It should be appreciated that, although shown and described here as being in the forming tool 29, the forming teeth 44 may alternatively be located in the inner surface of the die 28 in other embodiments, depending on the requirements of the desired annular preform. Therefore, any reference to or explanation of the forming teeth 44 apply equally regardless of whether they are located on the forming tool 29 or die 28. In at least one embodiment, the forming tool 29 may be cylindrical with forming teeth 44 extending from the entire or substantially entire circumference of the forming tool 29 along the longitudinal axis or direction 25 of the apparatus 100, as shown in FIGS. 15 and 11. Moreover, in at least one embodiment the forming teeth 44 extend along the entire length of the forming tool 29.

Figure 12:
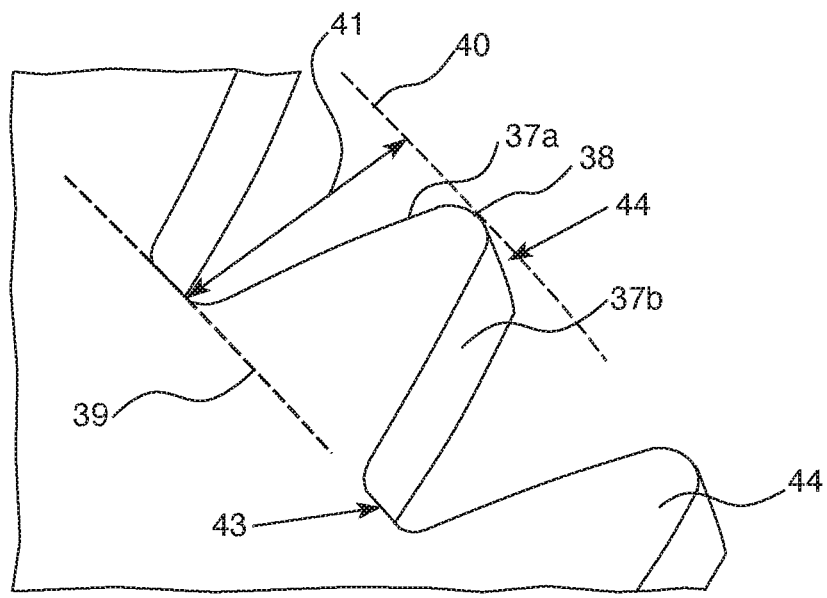
FIG. 12 is a detailed perspective view of the forming teeth of the surface densification apparatus.
Figure 13A:
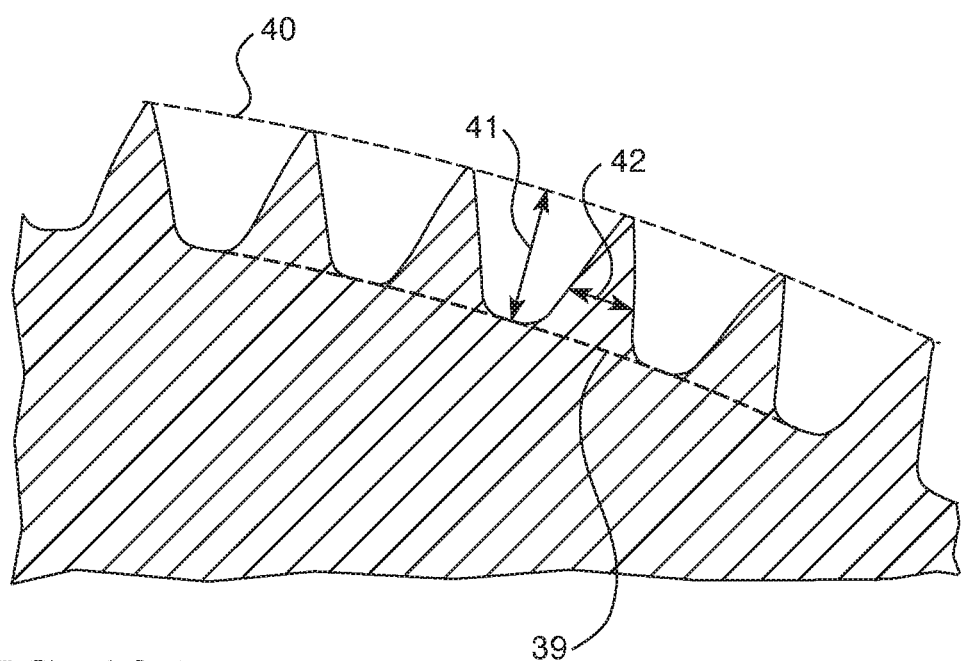
FIG. 13A is an exemplary detailed cross-sectional view of the forming teeth.

The forming teeth 44 are configured to correspond to and receive the helical teeth 9 of the preform 26 for densification. Accordingly, the forming teeth 44 may be similarly and complementarily dimensioned and disposed as the helical teeth 9 of the preform 26. For instance, in at least one embodiment, the forming teeth 44 may be helical, and may have the same or substantially the same angle β as the helical teeth 9. Each forming tooth 44 has a forming tooth depth 41 defined in the radial direction between a forming tooth root 43 and forming tooth tip 38, as shown in FIG. 12. It also has a forming tooth thickness 42 defined in the tangential or circumferential direction between first and second forming tooth flanks 37a, 37b, as shown in FIGS. 12 and 13A. The forming tooth tips 38 collectively define a major forming diameter 40 of the forming tool 29, as shown in FIGS. 12 and 13A. The forming tooth roots 43 collectively define a minor forming diameter 39 of the forming tool 29. However, while the forming teeth 44 are similarly dimensioned to the helical teeth 9, the forming teeth 44 differ in that the depth 41 and thickness 42 of each forming tooth 44 varies over the length 36 of each forming tooth 44. This variation provides the surface densification to the helical teeth 9 as they are moved through the forming teeth 44.

Figure 9:
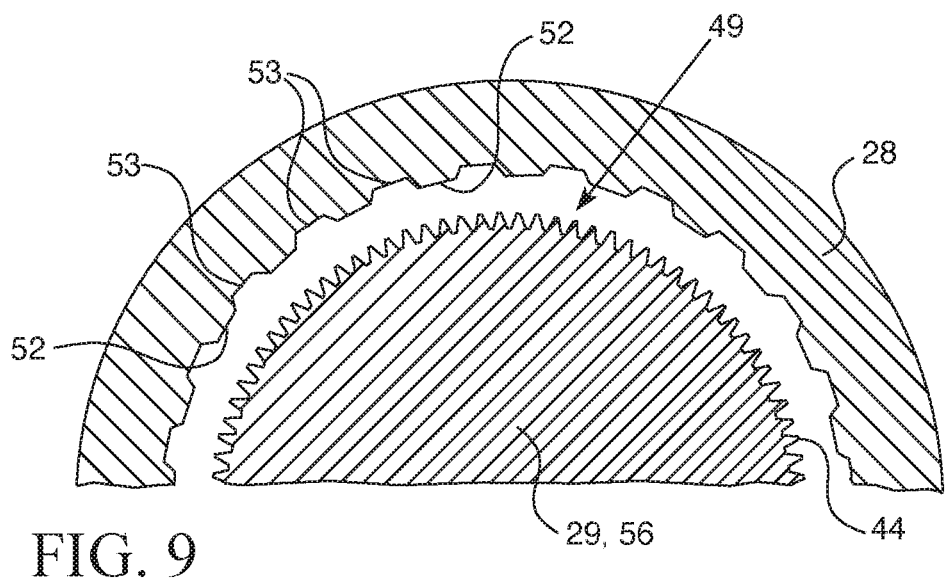
FIG. 9 is a cross-sectional view of the forming tool, die and aperture of FIG. 8.
Figure 10:
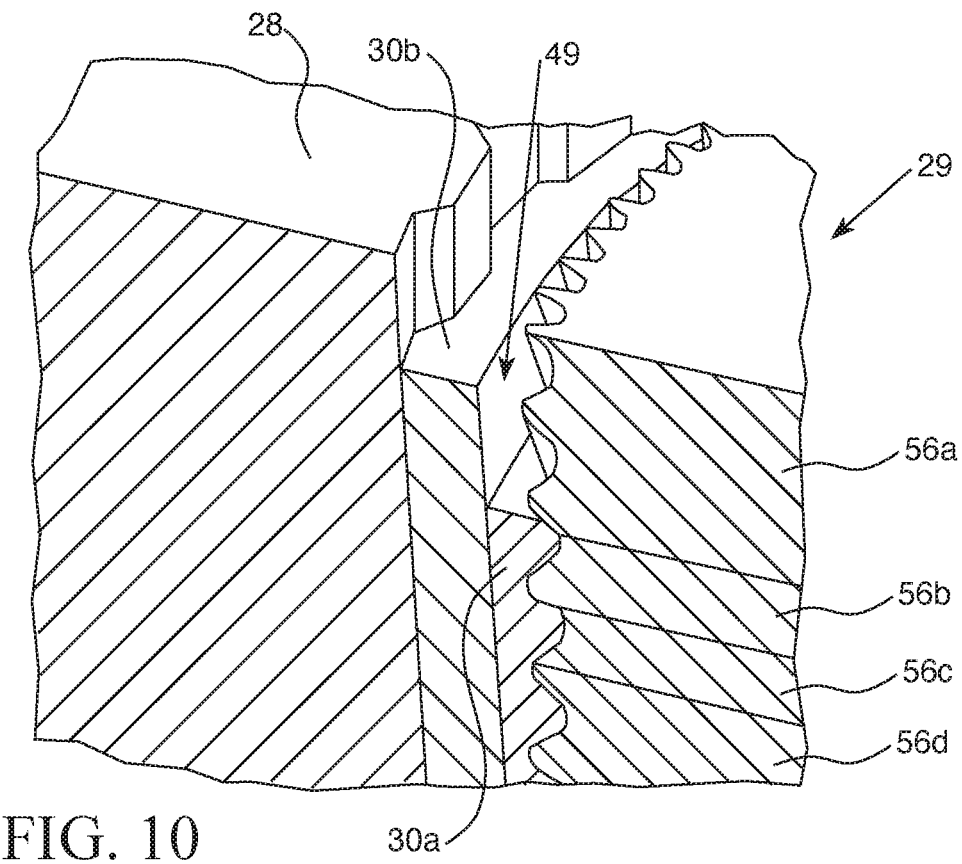
FIG. 10 is a partial cut-away perspective view of a die, forming tool, aperture and lower punches of the surface densification apparatus.

The forming teeth 44 are formed in at least one forming element 56. In the embodiment shown in FIGS. 8 and 9, the forming teeth 44 may be formed in a single forming element 56, which may also be the forming tool 29. In other embodiments, as shown in FIGS. 7A, 10 and 11, the forming teeth 44 may be formed in at least one of, though preferably a plurality of forming elements 56 arranged axially in succession along the longitudinal axis 25. There may be any number of forming elements 56a, 56b, 56c, 56d, etc., such as two, three, four, or more up to n number of forming elements. Collectively, these forming elements 56 may form the forming tool 29. The forming element(s) 56 may have any shape or configuration, such as but not limited to a disc, plate, cylinder, elongate rod, or other suitable structure. Each forming element 56 has slightly different dimensions that produces the variation in the forming tooth depths 41 and thicknesses 42. In this respect, the forming tool 29 may be considered a multi-stage tool.

Figure 7B:
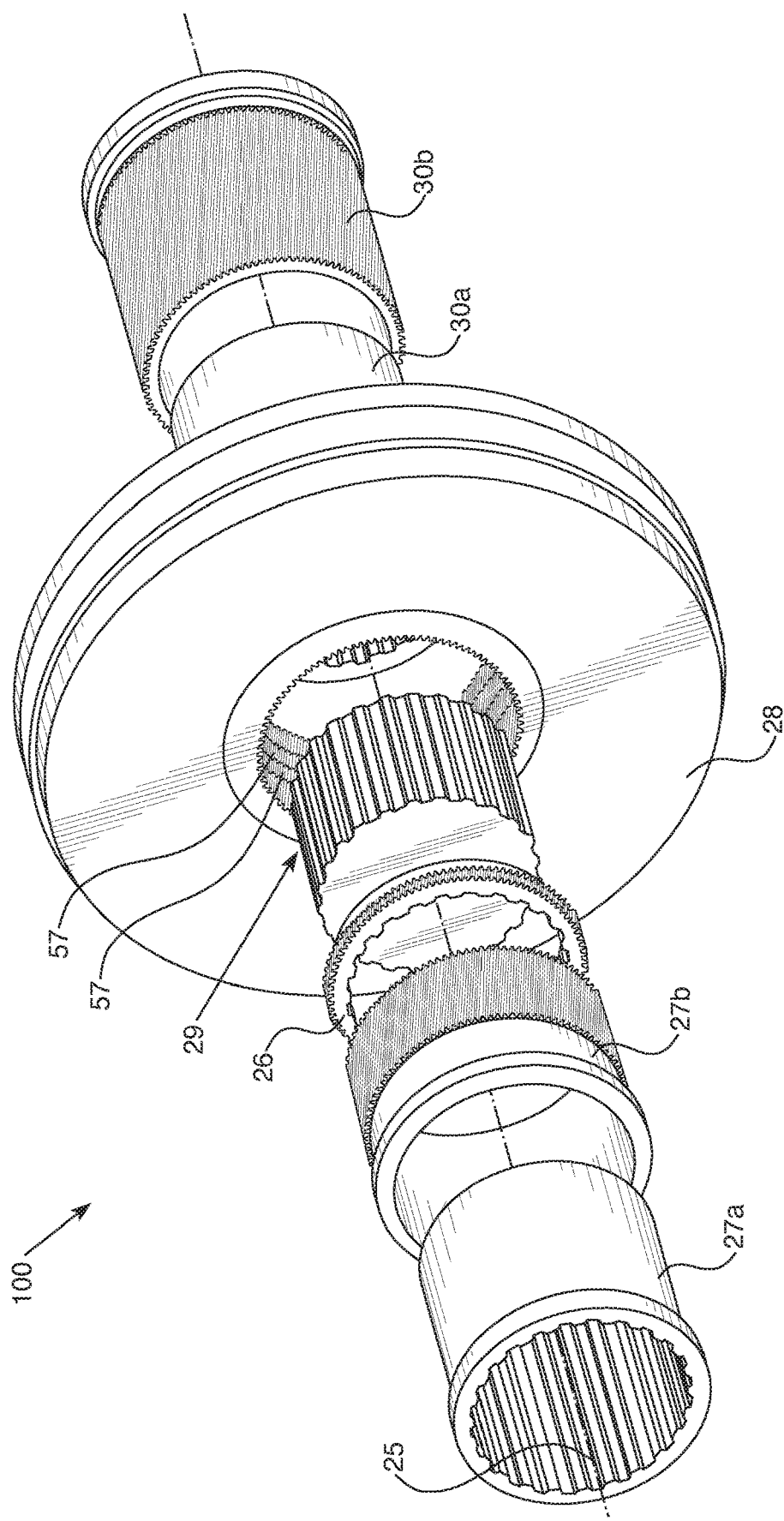
FIG. 7B is an exploded view of a second illustrative embodiment of the surface densification apparatus of the present invention where forming teeth are on the inner surface of the die.
Figure 7C:
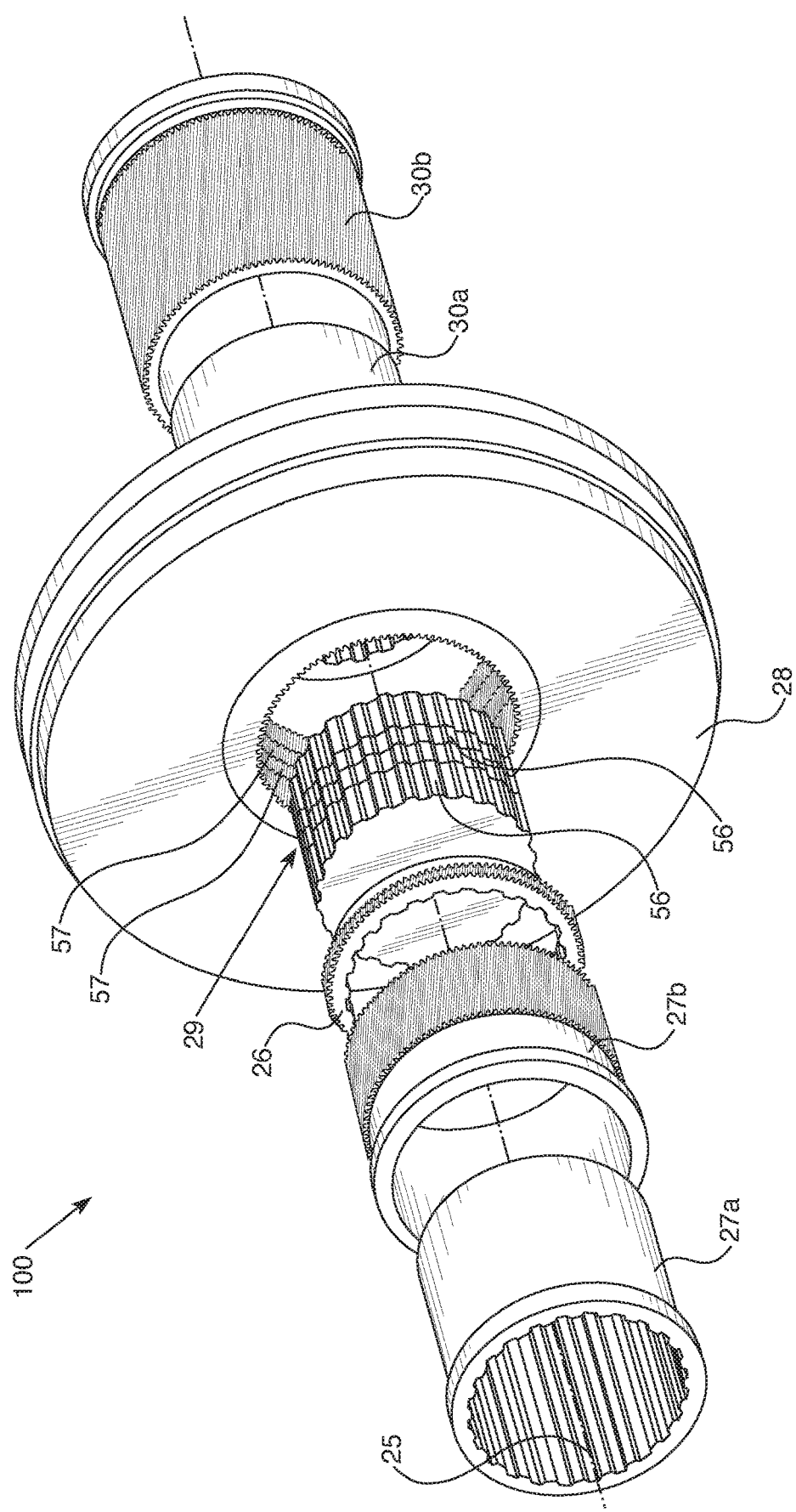
FIG. 7C is an exploded view of a third illustrative embodiment of the surface densification apparatus of the present invention where forming teeth are on both the outer surface of the forming tool and the inner surface of the die.
Figure 8:
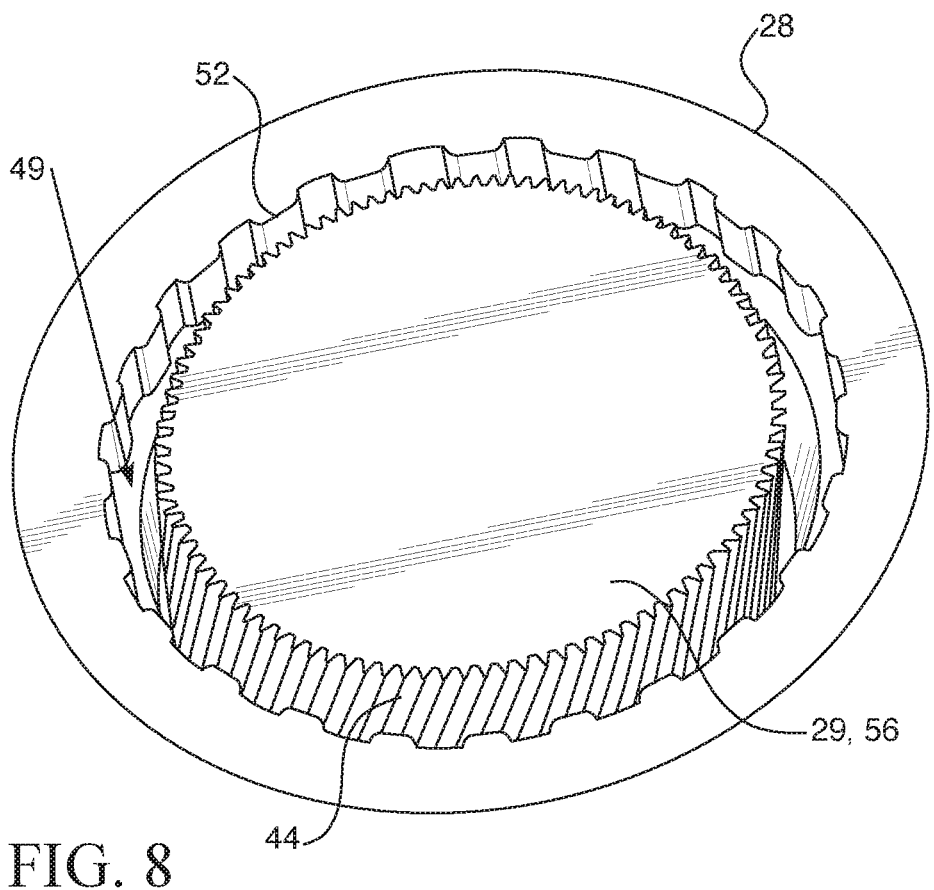
FIG. 8 is a top perspective view of one embodiment of the forming tool, die and aperture formed therebetween.

In embodiments where the die 28 includes the forming teeth 44, the die 28 may similarly include at least one, but preferably a plurality of die forming elements 57 as illustrated in FIG. 7B. The description of the forming elements 56 provided herein applies equally regardless of whether the forming tool 29 or die 28 has the forming teeth 44. In further embodiments, as shown in FIG. 7C, both the forming tool 29 and die 28 have forming elements 56, 57, respectively, and the helical forming teeth 44 may be in either or both. In such embodiments where both the forming tool 29 and die 28 have forming elements 56, 57, the forming elements 56, 57 provide an interference fit with the corresponding surface of the preform 26 such that surface densification can occur on both opposing sides of the preform 26 simultaneously, even if helical teeth are only on one side. Accordingly, there may be surface densification on axial splines as well as on helical teeth of the preform 26.

Each forming element 56 may be made of the same material or different material as compared to the other elements, but all are suitable for use in forming applications. Further, and with reference to FIG. 11, each forming element 56a, 56b, 56c, 56d includes a first surface 31 and opposite second surface 35 in the longitudinal direction, such that successive forming elements 56a, 56b, 56c, 56d are stacked or arranged with the second surface 35 of one forming element 56 facing, abutting and/or contacting the first surface 31 of an adjacent forming element 56. Each forming element 56 also includes a length 36 defined between the first and second surfaces 31, 35 thereof, as shown in FIGS. 11 and 15. Further, each forming element 56 includes forming teeth 44 described above, extending along the length 36 of each forming element 56 and being aligned between adjacent forming elements 56. In at least one embodiment, the forming teeth 44 of each forming element 56 are continuous with the forming teeth 44 on adjacent forming elements 56 when disposed contiguously with one another. The various forming elements 56 may be integrally formed or may be securely attached to one another, such as but not limited to by pins, bolts, welding or adhesive. In some embodiments, the forming elements 56a, 56b, 56c, 56d may include transitions between each, such as but not limited to rounded surfaces, to facilitate the continuous, uninterrupted nature of the forming teeth 44 there along.

Figure 13B:
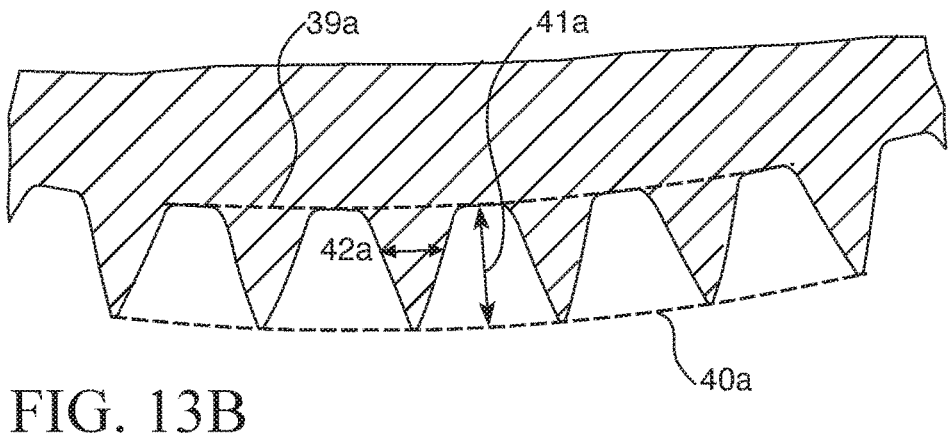
FIG. 13B is a detailed cross-sectional view of the teeth of a forming element in the entry portion.
Figure 14:
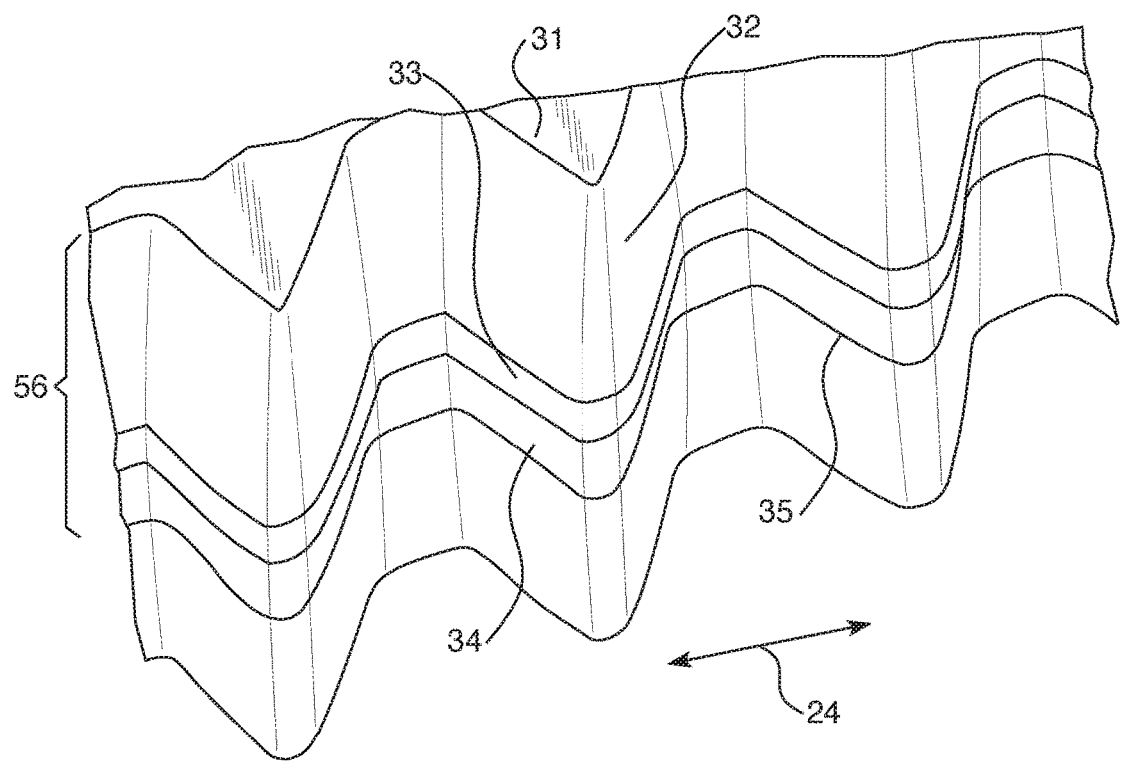
FIG. 14 is a detailed perspective view of the forming element.

With reference to FIGS. 14 and 15, each forming element 56 may include an entry portion 32 located at the first surface 31 of the forming element 56. Some embodiments may have a chamfered or rounded surface at the first surface 31. The entry portion 32 is preferably the first part of the forming element 56 the preform 26 encounters in the densification process and, in the case of the first forming element 56a, is provided to properly orient the preform 26, allowing for alignment and insertion through the forming teeth 44. In most embodiments, the entry portion 32 begins to provide initial compression on the preform 26 for densification, though in certain other embodiments compression may not begin in the entry portion. For instance, and with reference to FIGS. 13B and 15, each forming tooth 44 may have a first thickness 42a over the entry portion 32 of each forming element 56. This first thickness 42a varies over the length of the entry portion 32, and specifically increases such that each forming tooth 44 may have a smaller thickness at the first side 31 of the forming element 56 and increases to a greater thickness at the end of the entry portion 32 where it meets with the densification portion 33. The first thickness 42a may increase gradually over the entry portion 32, such as linearly at a fixed rate, although in certain embodiments it may increase in a non-linear fashion, such as logarithmically, exponentially, discontinuously, irregularly or otherwise.

Figure 13C:
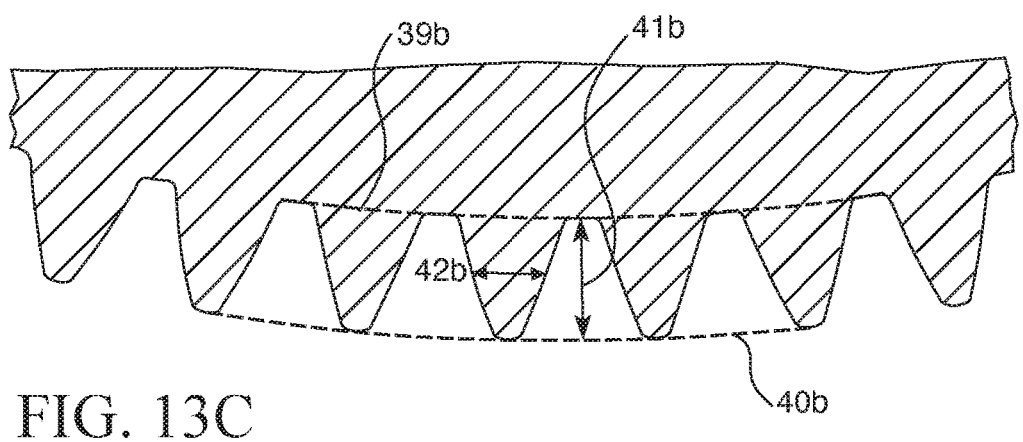
FIG. 13C is a detailed cross-sectional view of the teeth of a forming element in the densification portion.

Each of the forming elements 56 also includes a densification portion 33 which provides densification of the helical teeth 9 of the preform 26 when it is urged there along. Each forming tooth 44 has a second thickness 42b over the densification portion 33 of each forming element 56, as shown in FIGS. 13C and 15. The second thickness 42b is preferably the same as the largest dimension of the first thickness 42a where the entry portion 32 and densification portion 33 meet. Accordingly, the first and second thicknesses 42a, 42b may be substantially equivalent at the junction of the entry portion 32 and densification portion 33. In at least one embodiment, this second thickness 42b may be constant and uniform throughout the densification portion 33. In other embodiments, the second thickness 42b may vary along the densification portion 33, such as increasing or decreasing along the length thereof. For instance, it may increase or decrease, and may do so gradually over the densification portion 33, such as linearly at a fixed rate, or in a non-linear fashion, such as logarithmically, exponentially, discontinuously, irregularly or otherwise. It may also include any combination of increasing and decreasing along the second thickness 42b.

Figure 13D:
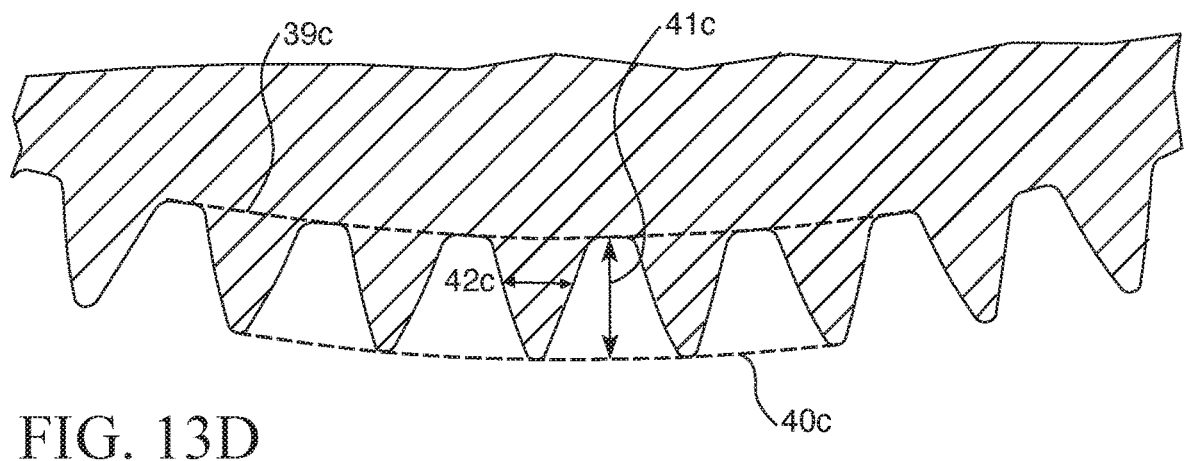
FIG. 13D is a detailed cross-sectional view of the teeth of a forming element in the exit portion.

In at least one embodiment, each forming element 56 may further include an exit portion 34 extending from the densification portion 33 to the second end 35 of the forming element 56. The exit portion 34 is dimensioned to allow for transition to the subsequent forming element 56. Each forming tooth 44 has a third thickness 42c over the exit portion 34, as shown in FIGS. 13D and 15. The third thickness 42c varies over the length of the exit portion 34, beginning at an initial thickness at the transition with densification portion 33 and decreasing over the length of the exit portion 34 to a smaller dimension at the end of the exit portion 34 at the bottom surface 35 of the forming plate 56. Accordingly, the second and third thicknesses 42b, 42c may be substantially equivalent at the junction of the densification portion 33 and the exit portion 34. The third thickness 42c may vary gradually over the exit portion 34, such as linearly at a fixed rate, or it may decrease in a non-linear fashion, such as logarithmically, exponentially, discontinuously, irregularly or otherwise. The bottom surface 35 may also have a chamfer or rounded configuration at the transition with the exit portion 34.

Accordingly, the varying thickness of the forming teeth 44 in the tangential direction 24 creates an hourglass shape of the spaces between adjacent forming teeth 44, as shown in FIG. 15. These spaces are formed by the facing forming tooth flanks 37 of adjacent forming teeth 44 and each receive a different helical tooth 9 of the preform 26 for densification. As the helical teeth 9 of the preform 26 are urged through the forming teeth 44, the widening first thickness 42a of the forming teeth 44 in the entry portion 32 apply increasing pressure and compression to the flanks 11 of the helical teeth 9, the constant second thickness 42b of the forming teeth 44 in the densification portion 33 maintains the pressure and compression on the flanks 11 of the helical teeth 9 for surface densification, and the narrowing third thickness 42c of the forming teeth 44 in the exit portion 34 releases the pressure and compression on the flanks 11 of the helical teeth 9 to permit relaxation and recovery of the helical teeth 9 of the preform 26. This occurs with passage through each of the forming elements 56.

The forming teeth depth 41 also varies along the length 36 of each forming element 56, but in the radial direction. For instance, the major forming diameter 40 of the forming element 56 is made up collectively of the forming tooth tips 38. This major forming diameter 40 may vary in the radial direction along the length 36 of the forming element 56. For instance, as shown in FIG. 13B, the major forming diameter 40 has a first major diameter 40a in the entry portion 32 and which increases in value over the entry portion 32. In other words, the first major diameter 40a is smaller at the top surface 31 of the forming element 56 and larger at the junction of the entry portion 32 and densification portion 33. As described above, the variation in the first major diameter 40a may be gradually over the entry portion 32, such as linearly at a fixed rate, or it may vary in a non-linear fashion, such as logarithmically, exponentially, discontinuously, irregularly or otherwise. Each forming element 56 also has a second major diameter 40b over the densification portion 33, typically of a constant value, as shown in FIG. 13C, though in other embodiments, the second major diameter 40b may vary over its length, either increasing or decreasing or combinations of both. The second major diameter 40b may be rounded or angled, having smooth or sharp transitions over its length, respectively. Each forming element 56 may have the same or different second major diameter 40b as compared to one another. Each forming element 56 may further have a third major diameter 40c that decreases over the length of the exit portion 34, such as by gradual, linearly at a fixed rate, or a non-linear fashion, such as logarithmically, exponentially, discontinuously, irregularly or otherwise, as shown in FIG. 13D. Preferably, the second major diameter 40b has the same value as the largest first and third major diameters 40a, 40c where they meet, respectively.

Additionally, the space between adjacent forming teeth 44 is bounded by a minor forming diameter 39 which also may vary in the radial direction 23 along the length 36 of each forming element 56. For instance, the minor forming diameter 39 has a first minor diameter 39a in the entry portion 32 as shown in FIG. 13B and which increases in value over the entry portion 32. In other words, the first minor diameter 39a is smaller at the top surface 31 of the forming element 56 and larger at the junction of the entry portion 32 and densification portion 33. This variation in the first minor diameter 39a may be gradual over the entry portion 32, such as linearly at a fixed rate, or it may vary in a non-linear fashion, such as logarithmically, exponentially, discontinuously, irregularly or otherwise. Each forming element 56 also includes a second minor diameter 39b over the densification portion 33 as shown in FIG. 13C, typically of a constant value, though in other embodiments, the second minor diameter 39b may vary over its length, either increasing or decreasing or combinations of both. The second minor diameter 39b may be rounded or angled, having smooth or sharp transitions over its length, respectively. Each forming element 56 may have the same or different second minor diameter 39b as compared to one another. Each forming element 56 may further have a third minor diameter 39c as shown in FIG. 13D that decreases over the length of the exit portion 34, such as by gradual, linearly at a fixed rate, or a non-linear fashion, such as logarithmically, exponentially, discontinuously, irregularly or otherwise. Preferably, the second minor diameter 39b has the same value as the largest first and third minor diameters 39a, 39c where they meet, respectively.

Collectively, the surfaces representing the minor forming diameters 39a, 39b, 39c, forming tooth flanks 37a, 37b and major forming diameters 40a, 40b, 40c are responsible for the surface densification of the helical teeth 9 along the helical tooth tips 13, flanks 11 and roots 12, respectively.

Figure 16:
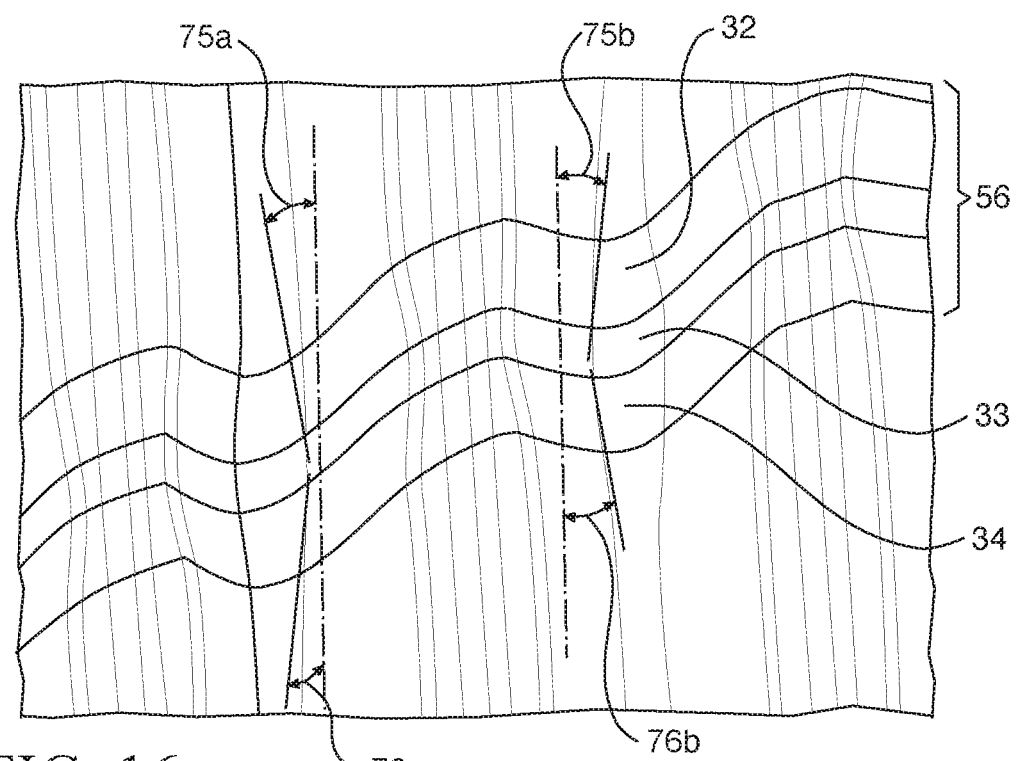
FIG. 16 is a perspective diagram of the forming element.

Additionally, the entry portion 32 of each forming element 56 may be characterized by entry angles 75a, 75b and the exit portion 34 may be characterized by angles 76a, 76b, as depicted in FIG. 16. The entry angles 75a, 75b may be the same as one another in some embodiments but may be different from one another in other embodiments. Similarly, the exit angles 76a, 76b may be the same as one another in some embodiments but may be different from one another in other embodiments. The entry angles 75a, 75b and exit angles 76a, 76b may be any angle up to 45° relative to the longitudinal axis 25.

In some embodiments, such as in FIG. 11, the various forming elements 56 may have increasing magnitude such that each successive forming element 56 increases the forming tooth thickness 42 so that those of the final forming element 56 have the largest size. In some embodiments there may be a single monolithic forming element 56 with steps cut and/or milled into the required forms at different axial positions. Further embodiments may include a relief or clearance machined over an axial length of the tool beyond the final forming element. Such relief may extend along a substantial length of the portion following the final forming element.

Figure 17:
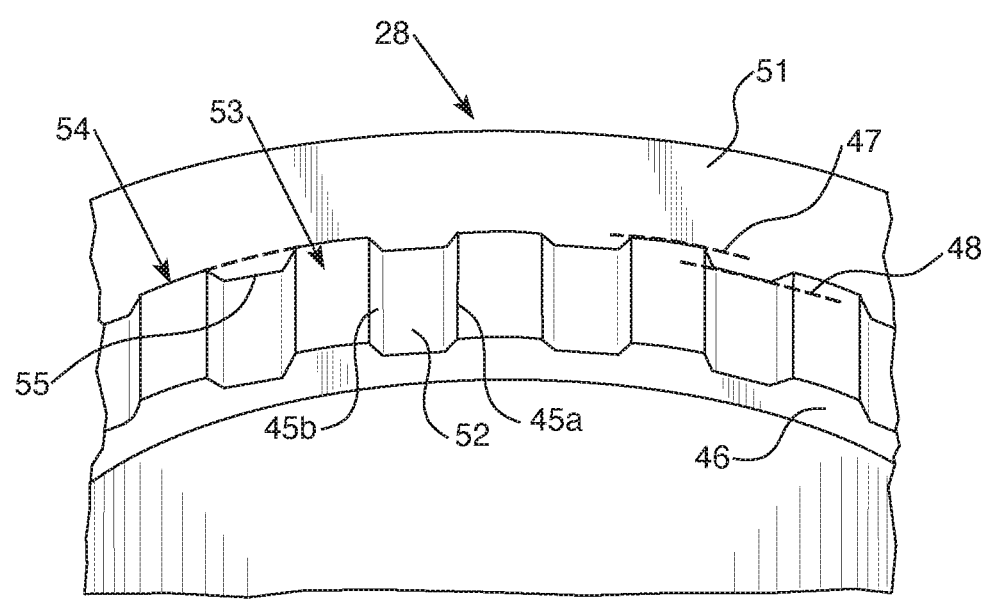
FIG. 17 is a partial perspective view of a die.

The densification apparatus 100 also includes a die 28 coaxially disposed about the forming tool 29 and spaced apart therefrom. The die 28 is shaped and configured to correspond to the external surface 3 of the preform 26. As shown in the embodiments of FIGS. 9-10 and 17, the die 28 comprises of a top surface 51, a straight section with die splines 52 forming grooves 53 therebetween that are comparable in dimension to the external splines 10 of the preform 26. Though described here as being in the die 28, it should be appreciated that the splines 52 may be present in forming tool 29 in such embodiments in which the die 28 includes the forming teeth 44. The die splines 52 are axially oriented along the length of the die 28, just as the external splines 10 of the preform 26. As illustrated in FIG. 17, each die spline 52 is defined between die spline flanks 45a, 45b in the tangential direction, and between die spline root 54 and die spline tip 55 in the radial direction. The surfaces extending between die splines 52 along the die spline roots 54 define a major inner die surface 47, which corresponds with the external spline tip 18 of the preform 26. Similarly, the surfaces extending along the die spline tips 55 define a minor die surface 48, which corresponds to the external spline root 17 of the preform 26. Accordingly, the width of the die splines 52, defined between die spline flanks 45a, 45b of a common die spline 52, is roughly the same dimension and corresponding shape as the space between adjacent external splines 10 of the preform 26. The grooves 53 between adjacent die splines 52 are correspondingly dimensioned and receive the external splines 10 of the preform 26. However, in some embodiments, the die 28 may have a smooth surface rather than die splines 52, such as when the corresponding preform 26 lacks any external splines 10.

In some embodiments, the die 28 may further include a die shelf 46, such as is shown in FIG. 17, that is configured and dimensioned to seat the preform 26 in the apparatus 100, such as to seat the flange 1 of the preform 26 in at least one embodiment. In such instances, the axial height of the die 28 may be defined as the distance between the die shelf 46 and the top surface 51 of the die 28. In some embodiments, the height of the die 28 may be substantially greater than the axial length of the flange 1 of the preform 26. In other embodiments, such as shown in FIGS. 7A and 10, the die 28 may lack a shelf and rather have the same radial inner profile along its entire longitudinal height. In these instances, at least one, but preferably a combination of second punches 30*a*, 30*b* may be used to support and guide the preform 26 from underneath while the die 28 supports and guides the outer surface 3 of the preform 26.

As noted previously, when the components of the surface densification apparatus 100 are assembled, the forming tool 29 and die 28 at least partially define an aperture 49 therebetween, such as illustrated in FIG. 10. At least one second punch 30 coaxially disposed about the forming tool 29 between and axially displaced from the forming tool 29 and die 28 may also define a lower limit of the aperture 49. In certain embodiments in which the die 28 includes a die shelf 46, the forming tool 29, die 28, die shelf 46 and a second punch 30 may collectively define the aperture 49, and further embodiments may also include an additional second punch 30*b* as well. Regardless of how formed, the aperture 49 is dimensioned to correspond closely to the shape of the preform 26, at both the inner and outer surfaces 2, 3. The aperture 49 is therefore dimensioned to receive and align the preform 26 for densification. The forming teeth 44 align with and will fit into the spaces between the helical teeth 9 of the preform 26, and the die splines 52 of the die 28 will likewise fit into the spaces between the gear splines 10 of the preform 26. The aperture 49 will provide an interactive, engaging, slightly/partially overlapping, frictional or otherwise interference fit between the forming teeth 44 and the helical teeth 9 of the preform 26 to create surface densification, as described below. As used herein, the term "interference" means interaction between components sufficient to produce surface densification at the contacting surface of the preform. The aperture 49 may also be dimensioned to provide interference between the outer surface 3 and external splines 10 with the die 28 in some embodiments. This interference is responsible for surface densification of the outer surface 3 and/or external splines 10 of the preform 26, such as in the range of about 0.025-0.300 mm overlapping. In other embodiments, the aperture 49 may be dimensioned to permit a small clearance of the outer surface 3 and external splines 10 of the preform 26 with the die 28, such as up to 0.300 mm, such that the outer surface 3 of the preform 26 is not densified.

Turning now to FIGS. 18-21, the method of surface densification is described with reference to the apparatus 100. Specifically, a preform 26 is first prepared by compacting and sintering an iron-based metal powder to a near-net shape. Preferably, the preform 26 will be compacted and sintered to have an average density in the range of about 7.0-7.4 gm/cm$^3$. The method further includes inserting the preform 26 into the apparatus, as illustrated in FIG. 18. Here, the apparatus 100 is already assembled, with the forming tool 29 at the center, a second inner punch 30*a* surrounding a bottom portion of the forming tool 29, a second outer punch 30*b* surrounding the second inner punch 30*a*, and the die 28 surrounding the upper portion of the forming tool 29 and second punches 30*a*, 30*b*. The second inner punch 30*a* has a plurality of teeth on an inner surface thereof that correspond to and interdigitate with the forming teeth 44 of the forming tool 29 and may therefore be helical teeth with the same helical angle as the forming teeth 44. Similarly, the second outer punch 30*b* may have a plurality of splines on an external surface thereof that correspond to and interdigitate with the die splines 52 of the die 28. It should be noted that in some embodiments, such as when the die 28 includes a die shelf 46, there may only be the second inner punch 30*a*, with the die shelf 46 taking the place of the second outer punch 30*b*. The outer surface of the second inner punch 30*a* and the inner surface of the second outer punch 30*b* are preferably smooth, lacking ornamentation or texture so that the second punches 30*a*, 30*b* may move relative to one another without interference. The second inner punch 30*a* corresponds to the external surface of the forming tool 29 and the second outer punch 30*b* corresponds to the internal surface of the die 28. Therefore, whether the second inner and outer punches 30*a*, 30*b* have helical teeth or splines will be dictated by the corresponding surfaces of the forming tool 29 and die, respectively.

Returning to the embodiment of FIGS. 18-21, the preform 26 is positioned in the aperture 49 created between the die 28, forming tool 29, and second punches 30*a*, 30*b* as described previously. Specifically, the preform 26 is initially seated over the second inner punch 30*a* and guided over the entry portion 32 of the first forming element 56, here of the forming tool 29. In other embodiments, the preform 26 may be initially seated over the second inner punch 30*a* and second outer punch 30*b*. During this stage, the forming tool 29 remains stationary with little to no interaction with the preform 26. The individual helical teeth 9 of the preform 26 are aligned with the spaces between the forming teeth 44. At the same time, the external splines 10 of the preform 26 are aligned with the grooves 53 within the die 28.

At least one first punch 27 is positioned above the seated preform 26, such as a first outer punch 27*b*. Like the second outer punch 30*b* described above, the first outer punch 27*b* may have a plurality of splines on an external surface thereof that correspond to and align with the external splines 10 of the preform 26. In some embodiments, the first outer punch 27*b* may lack splines on either surface and may instead be smooth. Likewise, the outer surface of the first inner punch 27*a* and the inner surface of the first outer punch 27*b* are preferably smooth in that they lack ornamentation or texture so that the first punches 27*a*, 27*b* may move relative to one another without interference. In some embodiments, there may be a first inner punch 27*a* that, like the second inner punch 30*a*, has a plurality of teeth on an inner surface thereof that correspond to and are aligned with the helical teeth 9 of the preform 26, and may therefore be helical teeth with the same helical angle as the helical teeth 9. In such embodiments, the first outer punch 27*b* may be positioned circumferentially surrounding the first inner punch 27*a*. The first inner punch 27*a* corresponds to the external surface of the forming tool 29 and the first outer punch 27*b* corresponds to the internal surface of the die 28. Therefore, whether the first inner and outer punches 27*a*, 27*b* have helical teeth or splines will be dictated by the corresponding surfaces of the forming tool 29 and die, respectively.

Figure 19:
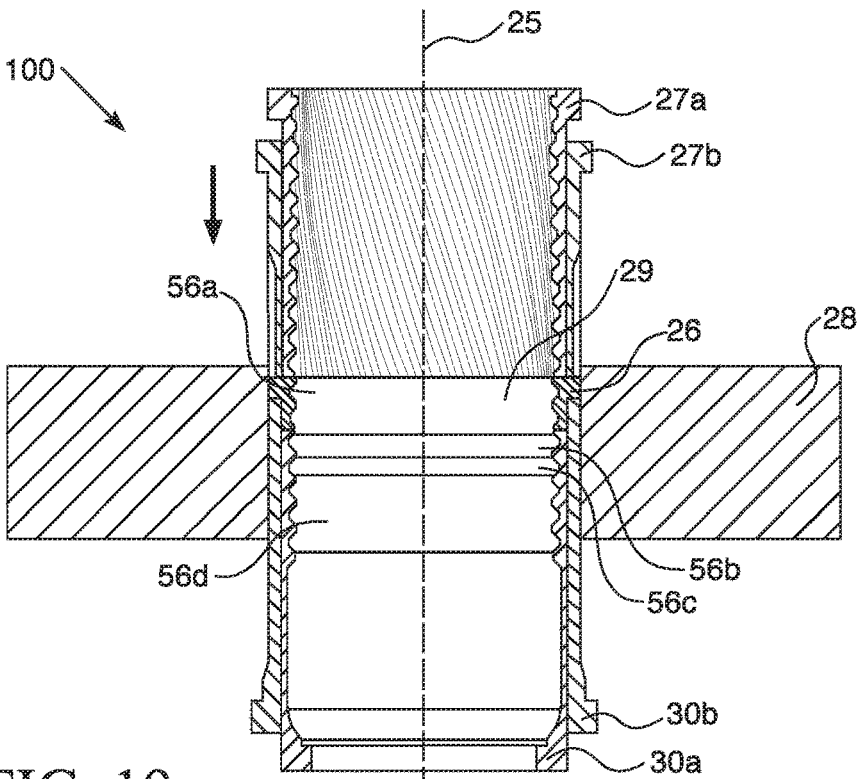
FIG. 19 is a cross-sectional view of the apparatus and method of FIG. 18, illustrating an encasing step of the method.

Next, the method continues with the step of encasing the preform 26 in the surface densification apparatus 100, as illustrated in FIG. 19. To accomplish this, the die 28 may be raised axially until the external splines 10 of the preform 26 are seated in the die shelf 46. In a different embodiment, the second punch 30, such as second outer punch 30b, may also be raised axially until the external splines 10 of the preform 26 are seated in the die shelf 46 or on the second punch 30. During this step, the preform 26 may encounter interference on one or more features of the grooves 53 in the die 28 such as the die spline flanks 45a, 45b or major and minor inner die surfaces 47, 48. The first punch(es) 27a, 27b may also move down axially. By the end of this step, the preform 26 is fully encased in the aperture 49, such that it is contacted on all sides by components of the apparatus 100 with little or no clearance between the preform 26 surfaces and the surrounding apparatus 100 components. Specifically, the inner surface 2 of the preform 26 is contacted by the forming tool 29, the outer surface 3 of the preform 26 is contacted by the die 28, the first side 4 of the preform is contacted by a first punch 27 and the second side 5 of the preform 26 is contacted by the die shelf 46 or a second punch 30. In embodiments where the preform 26 includes an offset flange 1, the first outer punch 27b contacts the first flange surface 7 of the preform flange 1, the first inner punch 27a contacts the first side 4 of the preform 26, the second outer punch 30b contacts the second flange surface 6 of the preform flange 1, and the second inner punch 30a contacts second side 5 of the preform 26.

Figure 20:
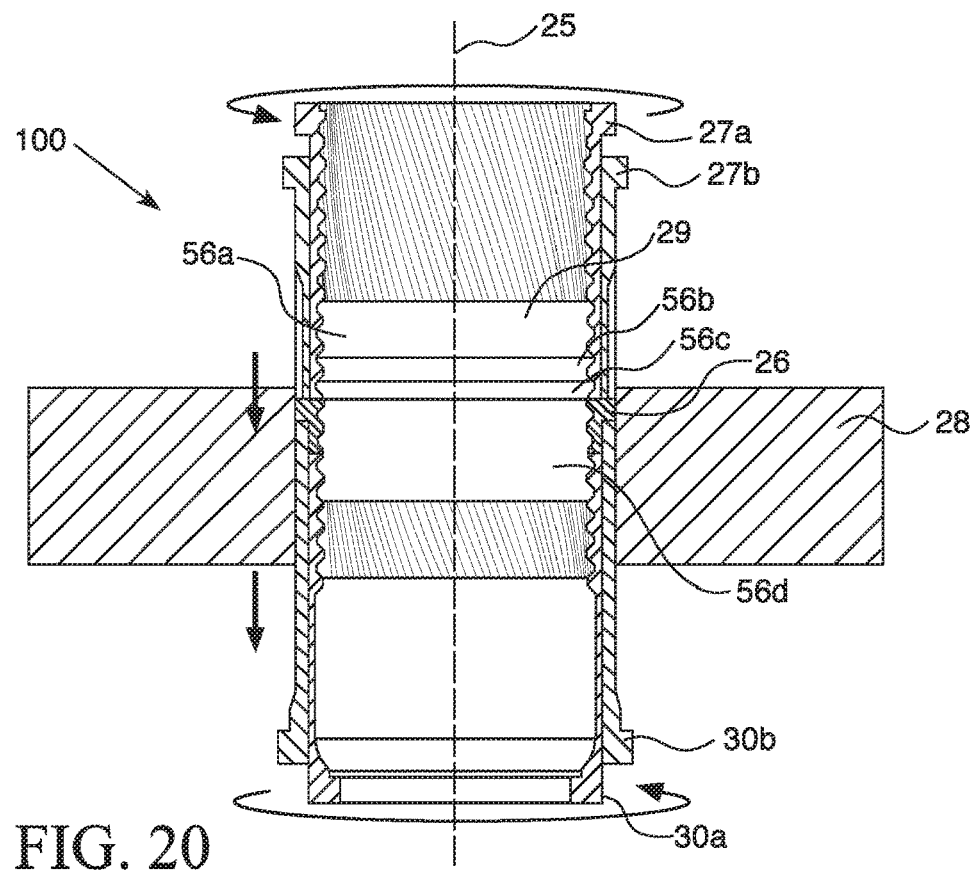
FIG. 20 is a cross-sectional view of the apparatus and method of FIG. 18, illustrating a densification step of the method.
Figure 21:
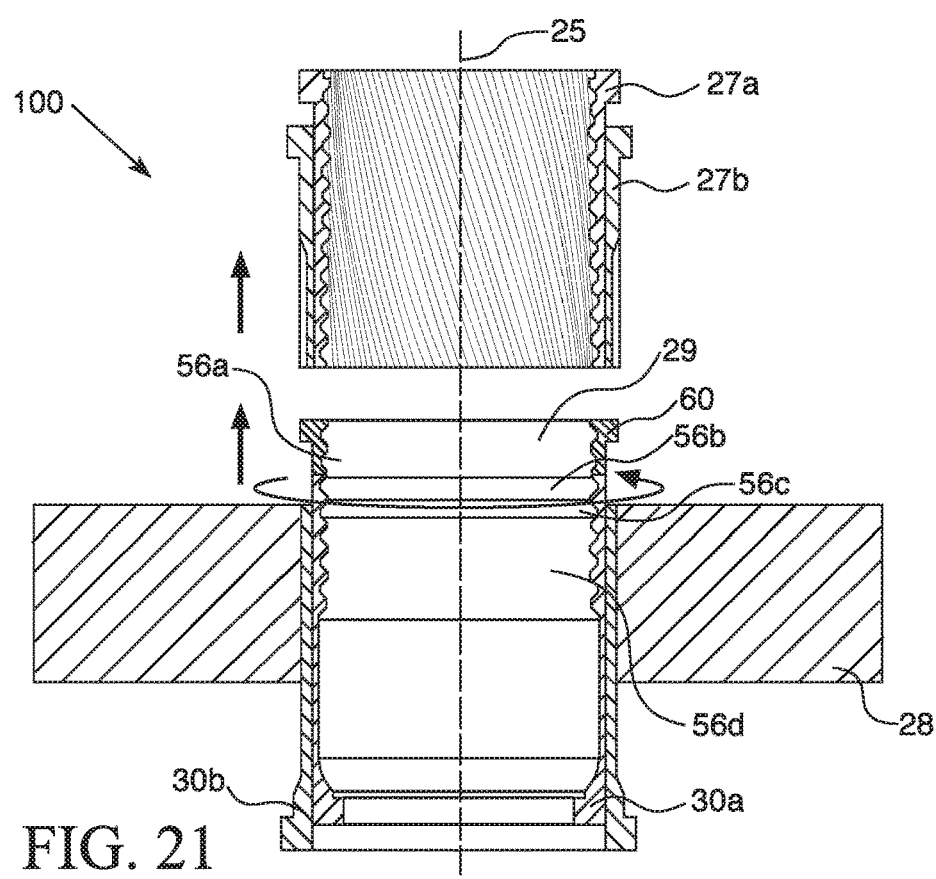
FIG. 21 is a cross-sectional view of the apparatus and method of FIG. 18, illustrating a removal step of the method.

The method continues with the step of surface densification, as illustrated in FIG. 20. Here, the encased preform 26 is moved axially in the longitudinal direction over the forming teeth 44 of the various forming elements 56a, 56b, 56c, 56d by the first punches 27a, 27b. The die 28 and punches 27, 30 in contact with and encasing the preform 26 also move correspondingly with the preform 26. The preform 26 remains fully encased in the components of the apparatus 100 during the densification step, such that contact between the preform 26 and the forming tool 29, die 28, first punch(es) 27 and second punch(es) 30 is maintained for the duration of the densification step. The motion of the preform 26, driven by the first punches 27a, 27b and guided by the second punches 30a, 30b is axial. This is mandated by the splines 10 on the exterior of the preform 26 in contact with and/or guided by corresponding spline grooves 53 on the die 28 which constrains the movement of the splines 10 and therefore of the preform 26.

In at least one embodiment, at least two first punches 27a, 27b are utilized to urge the preform 26 over the forming teeth 44. In such embodiments, the first punches 27a, 27b may enter the aperture 49 as they progress downward. Specifically, the first outer punch 30b travels axially in the longitudinal direction without rotation while the first inner punch 30a rotates over the forming tool 29 along the angled or helical forming teeth 44 while traveling axially downward. The entry of the two first punches 27a, 27b into the aperture 49 may help achieve optimum surface densification.

As the first punches 27a, 27b move axially downward toward the forming tool 29, they urge the preform 26 over the forming teeth 44, beginning with the entry portion 32 and continuing to the densification portion 33 of each forming element 56. The plurality of forming teeth 44 enter the spaces between the helical teeth 9 of the preform 26. The gear tooth flanks 11 contact the forming tooth flanks 37 of the forming teeth 44 of the forming tool 29. As the preform 26 moves down axially, the helical teeth 9 are forced into the narrowing hourglass space between the forming teeth 44 defined by the increasing tooth thickness 42a. Additional compression in the radial direction may be achieved by changing the forming tooth depth 41 demarcated by major and minor forming diameters 40a, 39a in the forming element 56. Changing the radial depth of space between forming teeth 44 may include decreasing or increasing the forming tooth depth 41 in the radial direction, such as by having a first tooth depth 41a different from a second tooth depth 41b and third tooth depth 41c, as shown in FIGS. 13B-13D. In at least one embodiment, the first tooth depth 41a may be the same or substantially equivalent to the third tooth depth 41c, and the intervening second tooth depth 41b may be less than or greater than the first and third tooth depths 41a, 41c. In other embodiments, the tooth depths 41a, 41b, 41c may be different from one another. In still other embodiments, the tooth depths 41a, 41b, 41c may be substantially equivalent to one another. The maximum compression of the helical teeth 9 is achieved in the densification portion 33 of the forming element 56 with the tooth thickness 42b and at the spaces bounded by major and minor forming diameters 40b, 39b. The helical teeth 9 of the preform 26, when subjected to the combined strain in the radial and tangential directions and constrained by the upper and lower punches 27, 30, experience plastic strain predominantly, leading to surface densification of the gear tooth flanks 11, tips 13 and roots 12.

The first and second punches 27, 30 hold the preform 26 sandwiched therebetween once it is encased in the aperture 49. Therefore, as the first punches 27a, 27b push down on the preform 26, such as from a hydraulic force applied to the first punches 27a, 27b, the preform 26 remains retained between the first and second punches 27, 30 as it moves over the forming elements 56. Accordingly, the second punches 30a, 30b may also move axially downward, either as a result of pressure from the first punches 27a, 27b transferred through the preform 26 or through independent control. Preferably, the first and second punches 27, 30 move at the same rate as the preform 26, and may be synchronized in their movement, so the preform 26 remains retained therebetween.

The straight axial form of the external splines 10 of the preform 26 as engaged by the corresponding spline grooves 53 in the die 28 dictates that the preform 26 moves in a corresponding straight axial movement over the various forming elements 56 in the longitudinal direction. However, the internal helical teeth 9 of the preform 26 and the inner teeth of the second inner punch 30a being angled and engaging the forming teeth 44 results in a twisting moment as the preform 26 is advanced over the external forming teeth 44. The forming tool 29 therefore rotates, such as supported on a bearing (not shown). Such rotation is directed by at least the internal helical teeth 9 of the preform 26, and in some embodiments also by the inner teeth of the second inner punch 30a, as the preform 26 is moved over the forming elements 56 in an axial direction along the longitudinal axis 25. In some embodiments, the forming tool 29 may be supported by a bearing beneath it to facilitate its rotation. In embodiments of the invention in which a die shelf 46 is substituted by a second outer punch 30b, the rotation of the accompanying second inner punch 30a may also be facilitated with a bearing. Additionally, the internal forms of the first and second inner punches 27a, 30a may be defined by helical teeth with space widths that are slightly larger than the thicknesses 42b of the forming teeth 44 in the forming portion 33 of the forming tool 29. The major and minor diameters of the internal forms of the first upper and lower punches 27a, 30a should be slightly clear of the major and minor forming diameters 40b, 39b of the forming tool 29 in the forming portion 33. The movement of the preform 26 continues as it passes over the densification portion 33 and into the exit portion 34 of the forming element 56, and further continues with subsequent progression over each successive forming element 56a, 56b, 56c, 56d, etc.

It should be noted that whichever component has the forming teeth 44 will rotate with respect to the component on the opposite side of the preform 26 as the preform 26 moves axially. The component on the opposite side of the preform from the helical teeth 9 may either remain stationary or may move axially with the preform 26. It may move at the same rate or a different rate than the preform 26.

In some embodiments, the method may further include an optional step of producing additional axial strain on the preform 26 by providing additional pressure from the first and second punches 27, 30, such as by squeezing therebetween, to achieve additional dimensional compaction and densification. This may occur at any step in the process once the preform 26 is encased in the apparatus 100, but in at least one embodiment may occur at the end of the densification procedure once the preform 26 has been forced past all forming elements 56. In other embodiments, it may occur between each forming element 56, and axial progression of the preform 26 may be temporarily halted or slowed to allow for axial compression steps at each juncture. In certain embodiments, such as when the forming tool 29 includes a relief following the forming portion 33, the method may include pushing the preform 26 into a relief section after passing the last forming element 56 but before applying additional axial pressure to the preform 26 from the first and second punches 27, 30.

Finally, the method concludes by removing the densified annular article 60 from the aperture 49. The first punches 27a, 27b may be raised to reveal the densified annular article 60. The die 28 is lowered, following which, the second punch 30 (or second inner punch 30a, when both second punches 30a, 30b are present) is raised to move and reveal the densified annular article over forming tool 29, as in FIG. 21. The densified annular article 60 may be removed by lifting from the first forming element 56a where it is seated to remove it from the apparatus 100.

It should be appreciated that the description of the method with reference to FIGS. 18-21 is but one example of the method of the present invention. For instance, though described here in terms of the preform 26 moving relative to the forming tool 29, it should be appreciated that any combinations and inversions of tool motion may be possible that achieve the same outcome in terms of movement of the preform 26 relative to the tools, including, for instance, an embodiment where the preform 26 may be held stationary while the forming tool 29 rotates and moves axially. It is also possible for the forming tool 29 to be completely stationary with the preform 26 and the remaining tools, including the die 28, first punches 30 and second punches 27 rotate and translate axially.

Further, while having described the forming tool 29 as rotating, it should be appreciated that it is the component which includes the forming teeth 44 that rotates. The component on the opposite side of the preform 26 may move axially or may be stationary. Accordingly, in certain embodiments the forming teeth 44 may be in the die 28 and the die 28 would thus rotate during densification. The forming tool 29 would therefore move axially or be held stationary.

In addition, other configurations of the apparatus 100 are contemplated. For instance, in some embodiments the forming tool 29 may be located in upper tooling that descends relative to the preform 26 for densification. Any configuration of forming tool 29, die 28, and first and second punches 27, 30 may be possible in the present apparatus 100 and method so long as the aperture 49 is configured to correspond to the preform 26 so as to substantially encase the preform 26, and applying sufficient constraints to the preform 26 during densification. At a minimum, the relationship between the forming tool 29 on one side and the die 28 on the opposite side of the preform 26 limits the available space in which the preform 26 may deform during densification.

The present method, such as implemented by the apparatus 100 described herein, produces a densified annular article 60 with a layer of near-full density (at least 99% full theoretical density) at depths in the range of 0.1-1.0 mm from the surface (preferably in the range of 0.5-1.0 mm deep, and more preferably 0.5-0.7 mm deep) and with a superior surface finish. For instance, results from one example of the present method are compared to those of the common method of broaching in Table 1. Specifically, the profile roughness values Ra and Rz of densified annular articles 60 formed by broaching and the present method are shown in Table 1 below.

TABLE 1

| Surface Finish | Broaching | Present Method & Apparatus |
| --- | --- | --- |
| Ra (μm) | 0.6 | 0.4 |
| Rz (μm) | 4.3 | 2.6 |

As these exemplary results indicate, the present method and apparatus are capable of producing densified annular articles with significantly lower roughness values as compared to the common broaching method, demonstrating the higher degree of surface finishing this method and apparatus achieves. In addition, the present method produces densified annular articles having a DIN 3962 (or AGMA 2015 or ISO 1328 equivalent) quality of 10 or better, such as in the range of 7 to 10. The contents of DIN 3962, AGMA 2015 and ISO 1328 as published on the filing date of this application are incorporated by reference herein in their entireties. Any reference herein to DIN 3962, AGMA 2015, or ISO 1328 shall be to the references as published on the filing date of this application. Such densified annular articles are ready for use in most applications involving planetary systems with no additional finishing operations on the gear form prior to heat treatment. The present method and apparatus 100 as described can be used to produce densified annular articles of high quality, fatigue strength and wear resistance comparable to other prevalent methods of manufacturing for gears.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. A method of densifying a powder metal annular preform having a longitudinal axis, an inner preform surface, an outer preform surface and helical teeth on at least one of the inner and outer preform surfaces, each of said helical teeth having at least one flank, root and tip surface, said method comprising:
inserting the preform into a correspondingly dimensioned aperture formed between:

(i) a forming tool having an external surface correspondingly configured to the inner preform surface and coaxial with said longitudinal axis, and (ii) a die disposed concentrically around and spaced apart from the forming tool coaxial with said longitudinal axis, the die having an internal surface correspondingly configured to the outer preform surface, wherein at least one of the external surface of the forming tool and the internal surface of the die have forming teeth correspondingly configured and dimensioned to compress the helical teeth of the preform, and the one of the external surface of the forming tool and the internal surface of the die having forming teeth rotates about the longitudinal axis as the preform moves axially along the longitudinal axis and the helical teeth move through the forming teeth; and forcing at least one of the preform, die and forming tool along the longitudinal axis, causing at least one of the preform, forming tool and die to rotate about the longitudinal axis resulting in the helical teeth of the preform being compressed by the corresponding forming teeth to selectively densify said surface of at least one of the flank, root and tip of the helical teeth.

2. The method as recited in claim 1, further comprising contacting the preform with a punch while forcing the preform along the longitudinal axis.

3. The method as recited in claim 1, further comprising compacting and sintering powder metal to produce the preform with an average density in the range of about 7.0-7.4 gm/cm$^3$ prior to inserting the preform into the aperture.

4. The method as recited in claim 1, further comprising providing additional axial pressure on the preform after densifying the at least one surface of the helical teeth.

5. The method as recited in claim 1, wherein the inner preform surface has helical teeth, and the external surface of the forming tool has corresponding forming teeth.

6. The method as recited in claim 5, further comprising moving the die along the longitudinal axis concurrently with the preform.

7. The method as recited in claim 1, wherein one of the inner and outer preform surfaces has helical teeth and the other of the inner and outer preform surfaces has axial splines, one of the external surface of the forming tool and the internal surface of the die have forming teeth and the other one of the external surface of the forming tool and the internal surface of the die have axial grooves, and forcing the preform along the longitudinal axis results in the one of the forming tool and the die having the forming teeth to rotate about the longitudinal axis and the axial splines limit rotational motion of the preform.

8. The method as recited in claim 7, wherein forcing the preform along the longitudinal axis results in the one of the forming tool and the die having axial grooves moving axially along the longitudinal axis.

9. The method as recited in claim 7, wherein compressing the helical teeth in the forming teeth results in densifying at least one of: a flank, a root and a tip of the axial splines of the preform and an outer diameter of the preform.

10. The method as recited in claim 1, further comprising contacting the preform with at least one first punch and at least one second punch while forcing the preform along the longitudinal axis wherein the preform further includes a first side extending between the inner and outer preform surfaces and an opposite second side extending between the inner and outer preform surfaces and spaced apart from the first side, further comprising contacting the first side with the at least one first punch and the second side with the at least one second punch and maintaining contact of first and second punches with the first and second sides of the preform for the duration of densifying the at least one surface of the helical teeth.

11. The method as recited in claim 10, wherein said first and second punches move synchronously during densification.

12. The method as recited in claim 10, wherein the preform further includes a flange defined by a first flange surface and opposite second flange surface, each of said first and second flange surfaces spaced apart from said first and second sides of said preform, the method further comprising contacting the first flange surface of the preform with a first outer punch, contacting the second flange surface of the preform with a second outer punch, contacting the first side of the preform with a first inner punch, and contacting the second side of the preform with a second inner punch for the duration of densifying the at least one surface of the helical teeth.

13. A densified annular article having at least one surface densified according to the method of claim 1, wherein each of an inner surface and an outer surface of said article further comprises one of teeth, splines, and one or more surface grooves, and wherein at least one of said inner surface and said outer surface is selectively uniformly densified along a longitudinal axis of said article.

14. The densified annular article as recited in claim 13, wherein said densified annular article has at least one of: (i) a DIN 3962 quality in the range of 7 to 10; (ii) an AGMA 2015 quality equivalent to DIN 3962 in the range of 7 to 10; and (iii) ISO 1328 quality equivalent to DIN 3962 in the range of 7 to 10.

15. The densified annular article as recited in claim 13, wherein said densified annular article has a profile roughness value of at least one of: Ra in the range of 0.2 to 1.0; and Rz in the range of 2.0 to 10.0.

16. The densified annular article as recited in claim 13, wherein said densified annular article is impregnated with an inorganic material.

17. The densified annular article as recited in claim 13, wherein said densified annular article is a ring gear for a planetary gear set.

18. The densified annular article as recited in claim 13, wherein said densified annular article has a densified surface layer of at least 99% full theoretical density up to a maximum of 1.0 mm from the at least one surface.

19. The densified annular article as recited in claim 18, wherein said densified annular article includes a plurality of helical teeth each having a root, at least one flank and a tip, said densified surface layer being at least one of said root, said flank and said tip of said helical teeth.

* * * * *